US012251360B1

(12) United States Patent
Futran

(10) Patent No.: US 12,251,360 B1
(45) Date of Patent: Mar. 18, 2025

(54) DISPENSER CAP FOR PRESCRIPTION AND OVER-THE-COUNTER PILL BOTTLES

(71) Applicant: Chaim Carmiel Futran, Brighton, MA (US)

(72) Inventor: Chaim Carmiel Futran, Brighton, MA (US)

( * ) Notice: Subject to any disclaimer, the term of this patent is extended or adjusted under 35 U.S.C. 154(b) by 119 days.

(21) Appl. No.: 17/875,488

(22) Filed: Jul. 28, 2022

(51) Int. Cl.
*A61J 1/03* (2023.01)
*A61J 7/00* (2006.01)

(52) U.S. Cl.
CPC ............... *A61J 7/0076* (2013.01); *A61J 1/03* (2013.01)

(58) Field of Classification Search
CPC ..................................................... A61J 7/0076
See application file for complete search history.

(56) References Cited

U.S. PATENT DOCUMENTS

2016/0228333 A1* 8/2016 Bukstein ................ G05B 15/02
2017/0275081 A1* 9/2017 Williams .................. A61J 1/03
2017/0281471 A1* 10/2017 Hamilton .............. A61J 7/0076
2019/0201293 A1* 7/2019 Brady ................... A61J 7/0445
2020/0130900 A1* 4/2020 Herbert ................ A61J 1/1412

* cited by examiner

*Primary Examiner* — Gene O Crawford
*Assistant Examiner* — Ayodeji T Ojofeitmi
(74) *Attorney, Agent, or Firm* — Gearhart Law, LLC

(57) ABSTRACT

A dispenser cap device for dispensing, through a single action, pills from a container is described. A main body is inserted into a container or has its own cavity and has an opening at a first position. A push piece comprises a chamber that is inserted into the main body. A cap component seals the push piece between itself and the main body and also has an opening at a second position. Turning the container upside down allows gravity to feed the pills through the opening of the main body into the push piece chamber at the first position. By compressing the springs, the push piece moves the pills from the first to the second position. The pills then fall out of the chamber through the second opening, dispensing a specific number of pills. The spring relaxes and allows for a quick secondary dispense if needed.

14 Claims, 27 Drawing Sheets

DISPENSER CAP FOR PRESCRIPTION AND OVER-THE-COUNTER PILL BOTTLES

FIELD OF THE EMBODIMENTS

The present invention is within the field of pharmaceutical drug containers and applies to prescription drugs, over-the-counter drugs, vitamins, and the like. Specifically, present invention relates to a dispenser cap device for prescription and over-the-counter pill bottles.

BACKGROUND OF THE EMBODIMENTS

Current pill containers used for both prescription and over-the-counter pharmaceutical products are a hassle to open to retrieve the contents housed therein and often are only partially filled, making it harder to remove the precise number of pills needed from the container. For example, it may be difficult for one having hand, wrist, or finger issues to not only open the container, but to take out the exact number of pills. Further, it is difficult for one to stick his/her fingers into the container to retrieve the medication. Thus, what is needed is an enhanced device that aids in the dispensing of pills and serves as a replacement of general caps.

Examples of Related Art Include:

U.S. Pat. No. 10,457,472 B2 and U.S. Pat. No. 9,669,989 B2 describe combination medicine containers and dispensers shaped similar to or generally the same as standard prescription medicament containers. The containers and dispensers are configured to dispense one medicament at a time through easy manipulation of integral dispensing means. Each combination medicine container and dispenser has a bottle, a cap, and an integral dispensing mechanism that cooperate with one or more structures of the bottle and/or cap to dispense one medicament at a time from the container. In one form, the combination medicine container and dispenser is designed to allow a user to dispense a single medicament through properly applied pressure. In another form, rotation of one or more components provides dispensing of a single medicament.

U.S. Published Patent Application No. 2017/0231871 A1 describes a pill dispenser. The pill dispenser is provided with a floor, a rotor rotatably coupled adjacent the floor, a base coupled to the rotor, and an indexing mechanism coupled to the rotor to index the rotor in a rotational direction relative to the base to a plurality of index positions. The floor is adapted to be coupled to a shell to define an inner cavity for receiving pills. The floor has a funneled opening extending therethrough. The rotor has a plurality of pill receptacles extending from a top surface to a bottom surface and a plurality of corresponding separation ramps. Each separation ramp extends from the top surface downward to connect with one side of the corresponding pill receptacle. In each of the index positions, one of the pill receptacles aligns with an exit of the funneled opening and another of the pill receptacles aligns with a pill-dispense opening of the base.

U.S. Pat. No. 9,636,279 B2 describes a pill bottle that allows for timed dispensing of medicine, as programmed by a physician, pharmacist, or caregiver. The device has a slot for pill entry in any one of the walls. The slot is sealable and lockable. In an unlocked and open condition, the slot is a portal from the outside of the bottle into an inner cavity. The cavity is adapted for pill storage and extends between the slot/opening for pill entry and an exit tube. The exit tube is sized for single-file passage of a plurality of pills. A button or blocking device (defined as a mechanical and/or physical object which prevents movement of a pill out of the device) is movable only at pre-programmed intervals of time, allowing the exit of a pill or dosage of pills.

U.S. Published Patent Application No. 2015/0090733 A1 describes devices that dispense medicine and dietary supplements in a solid dosage form. The dimensions of the selection slots for the solid dosage forms in a device can be customized in depth by adding or subtracting spacers, and in width by adding or subtracting thickness inserts, or otherwise by employing components of suitable dimensions.

U.S. Published Patent Application No. 2011/0155757 A1 describes packages for holding medicinal units and dispensing a single medicinal unit at one time. Likewise, the reference provides package inserts that limit dispensing of medicinal units to a single medicinal unit at one time.

U.S. Published Patent Application No. 2011/0147252 A1 describes packages, inserts and pharmaceutical products that are capable of holding a plurality of medicinal units and that limit the amount of medicinal units that are dispensed from the package at one time.

U.S. Published Patent Application No. 2009/0283538 A1 describes a counter (or recorder) for a pill dispenser comprising two relatively moveable chassis components that form part of a pill dispensement mechanism, a pill delivery or dispensement channel and a counting (or recording) mechanism. The counting (or recording) mechanism comprises one or more actuation indicators, a ratchet pawl for incrementally advancing a first of the one or more actuation indicators and a drive mechanism for activating the ratchet pawl. The ratchet pawl is mounted to a first of the two chassis components. The drive mechanism is mounted to the second of the two chassis components. The drive mechanism is connected to a pill detect feature that can move between a positive dispensement position and a negative dispensement position if the channel is clear, the negative dispensement position being such that at least a part of the pill detect feature is positioned within or blocking the pill delivery or dispensement channel.

U.S. Published Patent Application No. 2009/0014463 A1 describes a dispensing package that includes a container having a cylindrical neck finish with an open end and at least one internal bead spaced from the open end. A dispensing fitment has a conical inner portion and an outer portion with spaced external beads received by snap fit over the internal bead so that the dispensing fitment is spaced from the open end of the neck finish. The dispensing fitment preferably has an annular V-shaped cross section opening toward the open end of the neck finish, with an outer leg forming the outer portion of the fitment and an inner leg forming the inner portion of the fitment.

U.S. Published Patent Application No. 2007/0007301 A1 describes a pill dispenser apparatus embodied in a pill container element, and a method of dispensing one pill at a time from a container. The user may dispense a pill from the container by inverting the container, rotating the top, and returning the container to its upright position. A pill will then exit the apparatus under the force of gravity via a discharge opening.

U.S. Pat. No. 6,059,132 A describes a locking device that includes an internal closure cap having a threaded bore for engagement with the threads of a container or opening. The closure cap is structured with an upstanding stem which is open for discharging liquid. The outer surface of the stem has a rib gear section. A sleeve member superimpose the stem of the closure cap, whereby seals the tip. An annular shell surrounds the closure cap, and the sleeve member, controlling the engagement of the closure cap. However the sleeve member is structured with internal and external gearing formed to engage the outer ribbing of the closure cap and an internal ribbing within the annular shell, when raised vertically; whereby, a twisting action of the annular shell can be transferred to the closure cap for engaging and disengaging a threaded neck. A set of cylinders with marked flanges are positioned through the annular shell, superimposing the sleeve member, restricting its upward movement. The release position of the sleeve member can only be facilitated by rotating the flanges to a predetermined alignment.

U.S. Pat. No. 6,036,017 A describes a container for holding a prescription pills or other medication that includes a cylindrical receptacle, a detachable cap, and a label. A pill holder is positioned beneath the cap, which includes a magnifying lens, through which the interior of the pill holder can be viewed. The label includes the name of the prescribed medicine and a picture of a pill. When the prescription if filled, one pill is placed in the pill holder. The pill and the pill picture can then be compared to determine if the correct medicine has been provided. The label is prepared by providing a processor having a keyboard, a database including data relating to images of a plurality of prescription medicine pills, a label printer, and an unprinted label; entering the name of the prescription medicine into the processor; selecting an image of a pill in the database corresponding to the name; and printing the name and the selected image onto the label.

U.S. Pat. No. 7,988,016 B2 describes a pill dispensing cap that secures to a conventional pill container. The pill dispensing cap has a lower cap, a pill discharge port, and a spring loaded rotatable and slidable upper cap. Pills are dispensed one at a time, and the remaining pills are isolated from external contamination. A child resistant lock prevents small children and/or mentally handicapped individuals from easily accessing medicine inside the container. The child resistant lock uses a vertically slidable upper cap that is slidably and rotatably attached to the lower cap. A child safety lock uses a key in the upper cap that must be aligned with a slot in the lower cap to allow a pill to be dispensed. When the key and slot are aligned, the upper cap is vertically compressed against the lower cap. As the upper cap moves toward the base cap, a gravity fed pill discharge port is exposed which releases a single pill.

U.S. Pat. No. 9,849,069 B1 describes a push operated single pill, tablet, capsule, or other object dispenser that dispenses a single object at the push of a button.

U.S. Pat. No. 8,657,155 B2 describes a cap for a container configured for dispensing single items, such as pills, held in said container. The cap channel extends from an upper surface to a lower end providing a passageway through the cap to allow for a predetermined quantity of items to be transferred through a port in an upper portion of the cap. The cap has a lid moveable from a closed position to an open position. In its closed position dispensing of items is prevented; in its open position at least one item is dispensed through the port. A gate is operable, in a first orientation to partially block the passageway and, in a second orientation, to unblock the passageway to allow a preset number of items, to pass through. Alternatively, a diverter is incorporated to control flow of the contents.

U.S. Pat. No. 4,653,668 describes a container for storing and dispensing small objects, such as capsules or pills containing medicament, one at a time, consists of a receptacle containing, within itself, a delivery mechanism including a funnel-shaped exit port for capsules and a capsule or pill delivery tube at the end of said funnel-shaped exit designed to accommodate no more than one pill or capsule. This funnel divides the outer receptacle into an upper storage compartment and a lower delivery compartment. The receptacle also contains between the exit end of the receptacle and the delivery tube a resilient gate member positioned to prevent or allow escape of a capsule or pill from the delivery tube. The inner end of the receptacle is pressed into or twisted in the user's hand which moves the resiliently mounted gate members, thus opening the delivery tube and delivering a single small object to the user. The user then releases pressure on the exit end of the receptacle which at the same time releases the resilient gate allowing them to return to the rest position thus preventing the exit of the second small object until the cycle is restarted.

Some similar systems exist in the art. However, their means of operation are substantially different from the present disclosure, as the other inventions fail to solve all the problems taught by the present disclosure.

SUMMARY OF THE EMBODIMENTS

The present invention and its embodiments relate to a dispenser cap device for prescription and over-the-counter pill bottles.

An embodiment of the present invention describes a dispenser cap device that aids in dispensing pills from a container. The dispenser cap device includes numerous components, including a main body component, a push piece component, and a cap component. The main body component includes a first opening at a first position. The main body component is insertable into a container. The push piece component includes a chamber that is pushed along springs. The push piece component is insertable into the main body component. The cap component includes a second opening at a second position. The cap component is configured to seal the push piece component between itself and the main body component. When a user turns the container upside down, gravity feeds the pills through the first opening of the main body component into the chamber of the push piece component at the first position. Moreover, compression of the springs allows the push piece component to move the pills from the first position to the second position such that the pills fall out of the chamber through the second opening at the second position.

The main body component, the push piece component, the cap component, and the springs, through a single action, dispense the pills from the container. Further, in some examples, the main body component also includes a locking mechanism to prohibit dispensing of the pills if a lock is in a locked position. In other examples, the cap component is attached to the main body component by corresponding male protrusions and female recessions.

In some examples, the dispenser cap device also includes a removable bottom component disposed inside of the main body component. The main body component comprises a bottom component manufactured inside of the main body component. In some examples, the pills are stored in the container. In other examples, a cavity inside of the main body component stores the pills.

Another embodiment of the present invention describes a dispenser cap device that aids in dispensing pills from a prescription bottle. The dispenser cap device includes a main body component, a push piece component, and a cap component. The main body component includes a first opening at a first position. The push piece component includes a chamber that is pushed along springs. The push piece component is insertable into the main body component. The cap component includes a second opening in a second position. The cap component is configured to seal the push piece component between itself and the main body component. When a user turns the prescription bottle upside down, gravity feeds the pills through the first opening of the main body component into the chamber of the push piece at the first position. Further, compression of the springs allows the push piece component to move the pills from the first position to the second position such that the pills fall out of the chamber through the second opening to dispense the pills.

In some examples, a portion of the dispenser cap device is inserted into the prescription bottle by a tight fit snap component or by a threaded component. Moreover, in some examples, the dispenser cap device is about 0.75 inches in height and about 1.5 inches in width excluding the push piece component at a maximum extension.

Another embodiment of the present invention describes a dispenser cap device that aids in dispensing pills from a container. The dispenser cap device includes a main body component, a pin component, a push piece component, and a cap component. The main body component includes a first opening at a first position. The push piece component includes a chamber that is pushed along springs. The push piece component is insertable into the main body component. The cap component includes a second opening in a second position. The cap component is configured to seal the push piece component between itself and the main body component. When a user rotates the pin component 90 degrees, the push piece component moves from the first position to the second position such that the pills fall out of the chamber through the second opening to dispense the pills.

Another embodiment of the present invention describes a cap component of a dispenser cap device that aids in dispensing pills from a container. The cap component includes a top side disposed opposite a bottom side, a first side disposed opposite a second side, a third side disposed opposite a fourth side, an opening, at least one spring, and at least one push component. When a user engages the at least one push component, the at least one spring compresses, moving the opening from a closed position to an open position. Further, in some examples, a quantity of the at least one push component is one. In other examples, a quantity of the at least one push component is two.

Another embodiment of the present invention describes a dispenser cap device that aids in dispensing pills. The dispenser cap device includes a first portion affixed to a second portion. The first portion includes a substantially circular planar portion having a first side disposed opposite a second side, an opening disposed therein, and a wall disposed circumferentially around and extending away from the second side of the substantially circular planar portion. The second portion includes a hollow component having an interior side disposed opposite an exterior side and a planar portion located proximate and extending away from the second side of the substantially circular planar portion of the first portion. A diameter of the substantially circular planar portion of the first portion is larger than a diameter of the planar portion of the second portion such that the wall comes into a slidable contact with the exterior side of the second portion. When a user pushes the first portion towards the second portion, the second side of the substantially circular planar portion of the first portion comes into contact with the planar closed portion, allowing for the dispensing of pills from an interior of the cylindrical portion.

DESCRIPTION OF THE PREFERRED EMBODIMENTS

Figure 1:
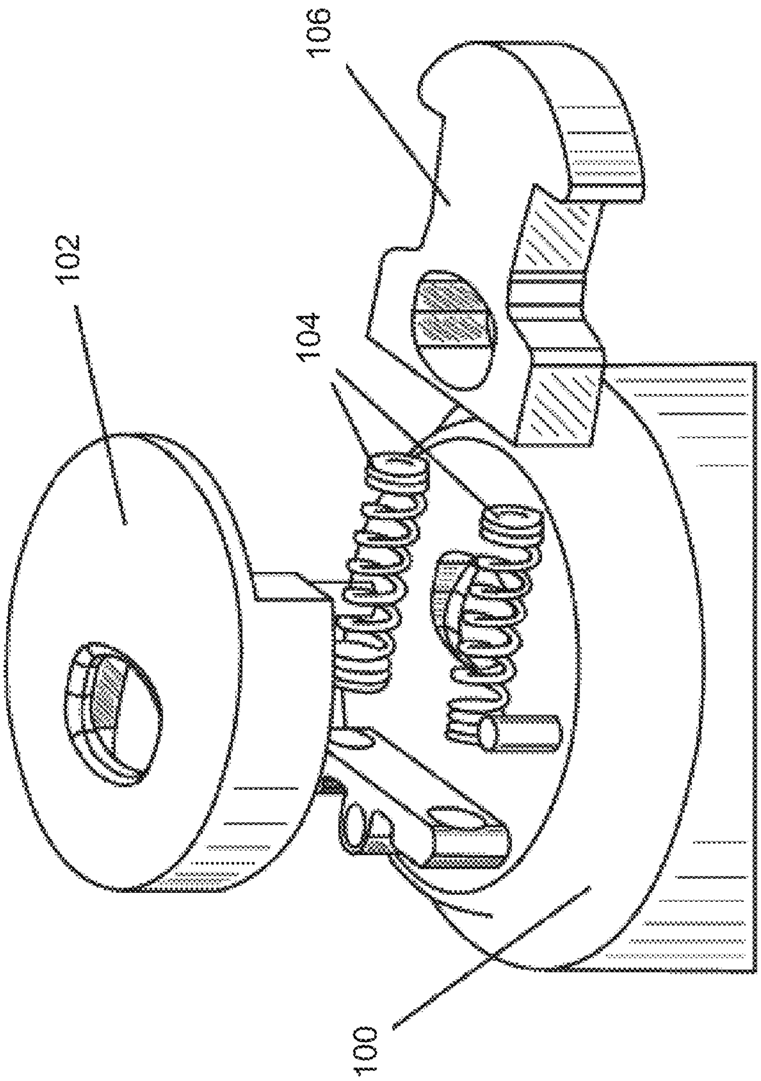
FIG. 1 depicts a schematic diagram of an embodiment of the dispenser cap device as an over-the-counter prescription bottle, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described herein. The materials, methods, and examples are illustrative only and not intended to be limiting. Other features of the disclosure are apparent from the following detailed description and the claims.

As used herein, the singular forms "a," "an," and "the," are intended to include the plural forms as well, unless the context clearly indicates otherwise.

The phrase "and/or," as used herein in the specification and in the claims, should be understood to mean "either or both" of the elements so conjoined, i.e., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the term "about" is used in conjunction with a numerical range, it modifies that range by extending the boundaries above and below those numerical values. In general, the term "about" is used herein to modify a numerical value above and below the stated value by a variance of 20%, 10%, 5%, or 1%. In certain embodiments, the term "about" is used to modify a numerical value above and below the stated value by a variance of 10%. In certain embodiments, the term "about" is used to modify a numerical value above and below the stated value by a variance of 5%. In certain embodiments, the term "about" is used to modify a numerical value above and below the stated value by a variance of 1%.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The present invention describes a dispenser cap device that aids in the dispensing of pills from a container and serves as a replacement of general caps. Where pharmaceutical products, like prescription and over-the-counter medication, come in hard-to-open bottles or are only partially filled, the dispenser cap device of the present invention does not require the prescription container or bottle to be opened and also easily dispenses a specific number of pills needed for the user. Furthermore, once the dispenser cap device is inserted into the container, there is no opening required anymore. Further, since this dispenser cap device described herein dispenses the pills, the dispenser cap device can be manufactured to an exact dosage, thus not requiring any counting of the pills. As such, the size of each part/component of the system varies with the size and shape of the pills.

The dispenser cap device of the present invention generally consists of three manufactured parts and springs that, through a single action, dispenses the pills from a container, that is either part of the dispenser cap device or not. The main body component of the dispenser cap device either is inserted into the container or has its own cavity, and further has an opening at a first position. A push piece component has a chamber that is pushed along springs and is inserted into the main body component. The cap component seals the push piece in between itself and the main body component and further has an opening in a second position. Turning the container upside down allows gravity to feed the pills through a first opening in the main body component into the push piece's chamber at the first position. By compressing the springs, the push piece component moves the pills from the first position to the second position. The pills then fall out of the chamber through the second opening, dispensing a specific number of pills. The spring relaxes and allows for a quick secondary dispense if needed.

Furthermore, in some embodiments described herein, a chamber component moves as a user engages in a push action. In other embodiments described herein, the chamber component remains stationary as doors open and close. It should be appreciated that each of the embodiments described herein can be stand-alone devices or may be affixed to an existing and generic pill bottle/container.

FIG. 1 depicts a schematic diagram of an embodiment of the dispenser cap device as an over-the-counter prescription bottle. Specifically, FIG. 1 depicts a main body component 100 that holds the prescription pills, a cap component 102, springs 104, and a push piece component 106. Though two springs 104 are depicted, this quantity is not deemed to be limiting and other quantities of the springs 104 may be used. It should be appreciated that in some examples, a locking mechanism or a child safety locking mechanism may be added to the main body component 100 to only allow for dispensing of the prescription pill(s) if the lock is in an unlocked position.

Figure 2:
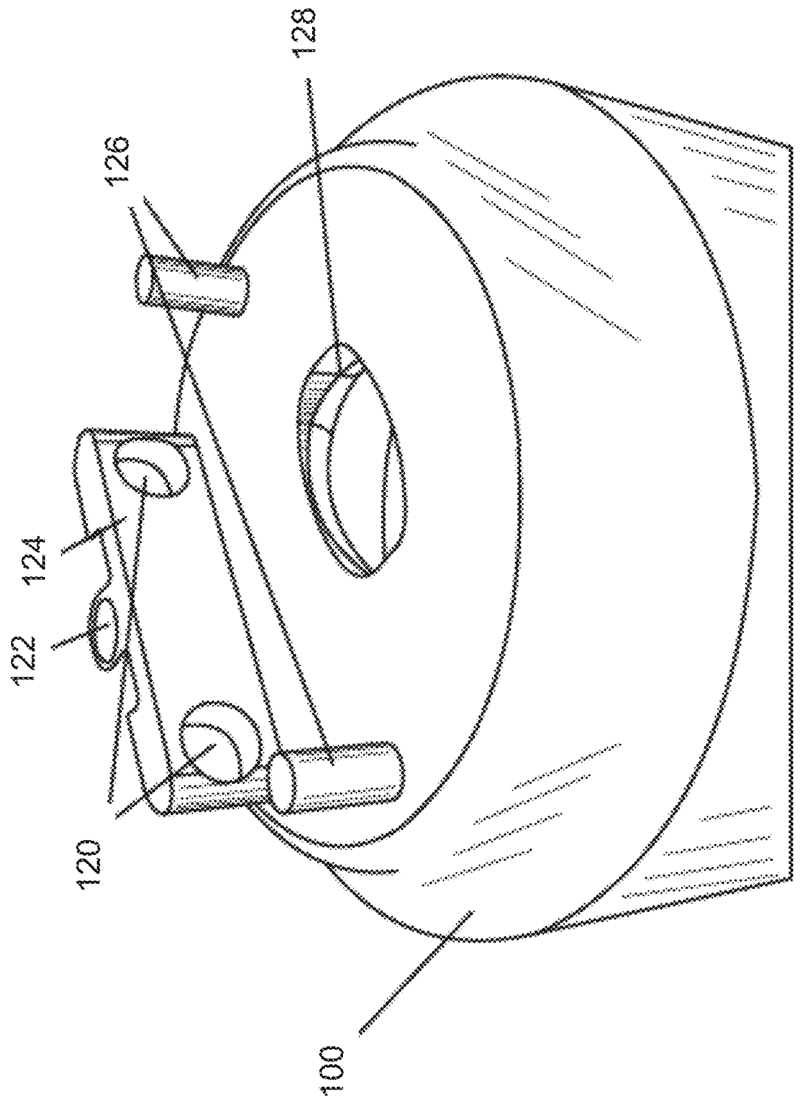
FIG. 2 depicts a more detailed schematic diagram of a main body component of a dispenser cap device, according to at least some embodiments disclosed herein.
Figure 7A:
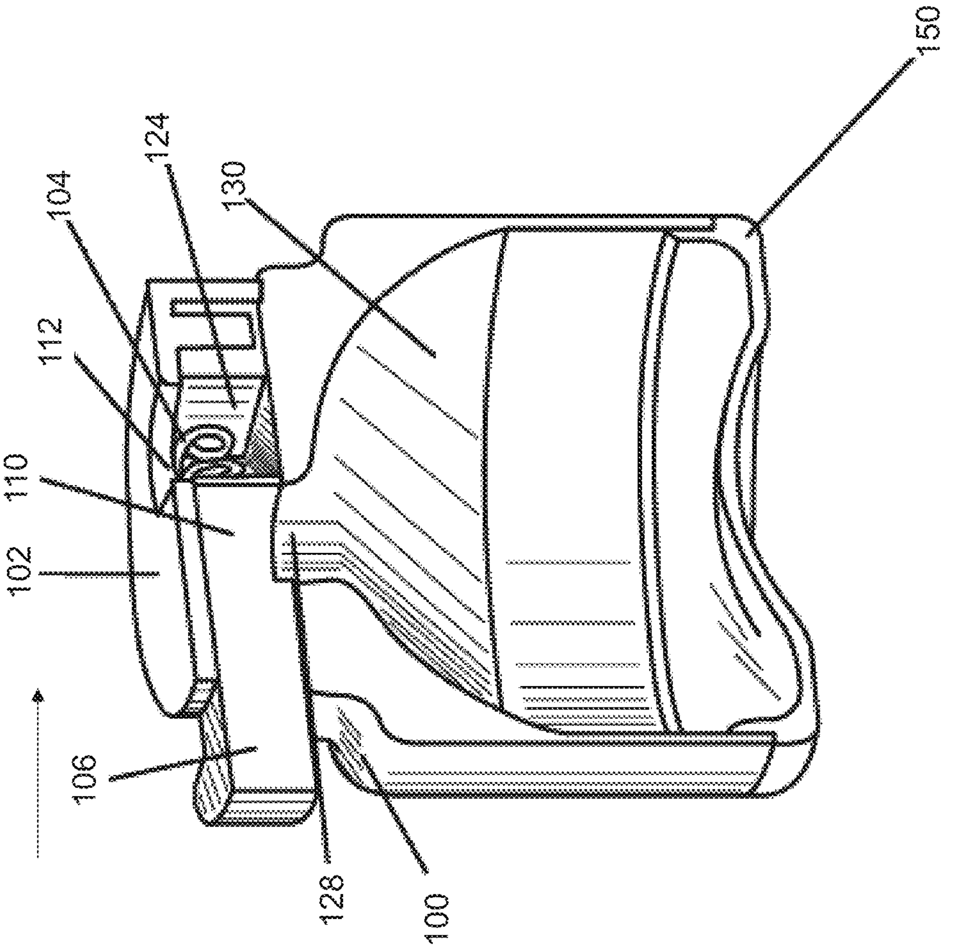
FIG. 7A depicts a schematic and cut-away view of a first position associated with a dispenser cap device, according to at least some embodiments disclosed herein.
Figure 7B:
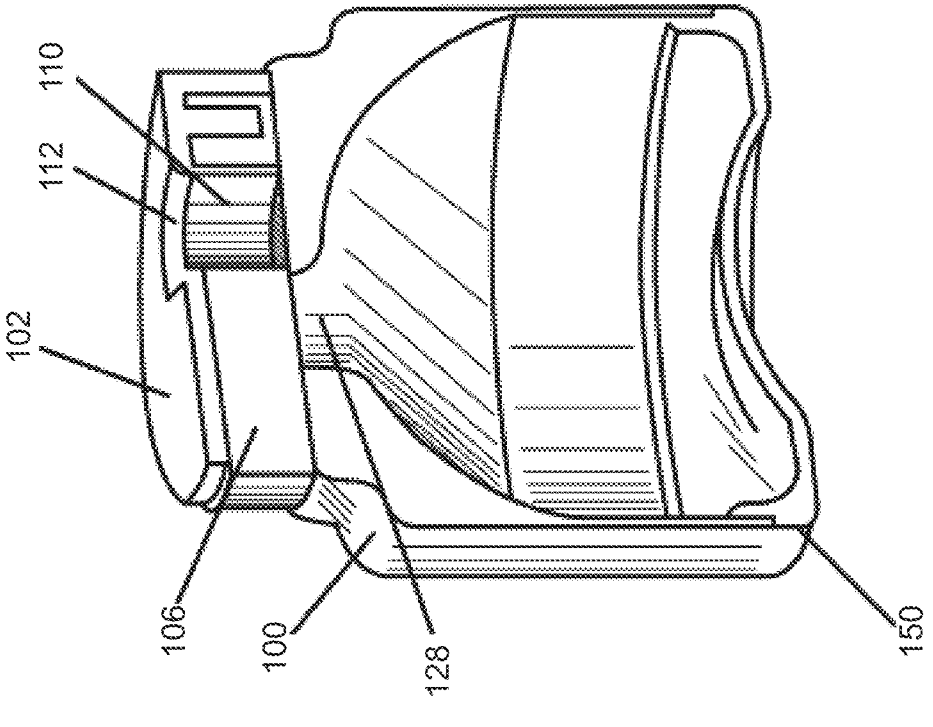
FIG. 7B depicts a schematic and cut-away view of a second position associated with a dispenser cap device, according to at least some embodiments disclosed herein.

FIG. 2 depicts a more detailed schematic diagram of the main body component 100 of the dispenser cap device. As shown in FIG. 2, each of the springs 104 of FIG. 1 are inserted into a receiving portion 120, respectively. The cap component 102 of FIG. 1 is attached to the main body component 100 by male connections or protrusions 126 and female connections or recessions 122. The female connections or recessions 122 are attached with a protruding member 114 of FIG. 3 and a receiving member 116 of FIG. 3. When the push piece component 106 of FIG. 1 is pushed from a first position as shown in FIG. 7A to a second position as shown in FIG. 7B, it is stopped by hitting a wall at a position 124 of FIG. 2. Moreover, the prescription pills or medication are fed through a cavity 128. The cavity 128 is at the first position of the push piece component 106, as shown in FIG. 7A. It should be appreciated that the push piece component 106 is easy to engage and press, as shown by the arrow in FIG. 7A, and further, does not strain joints of the user.

Figure 3:
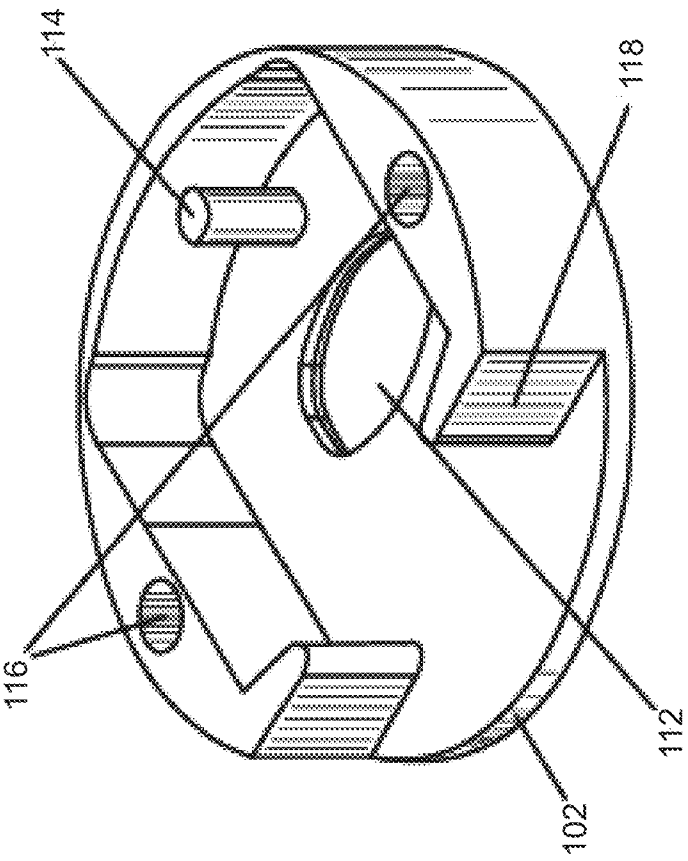
FIG. 3 depicts a more detailed schematic view of a cap component of a dispenser cap device, according to at least some embodiments disclosed herein.
Figure 4:
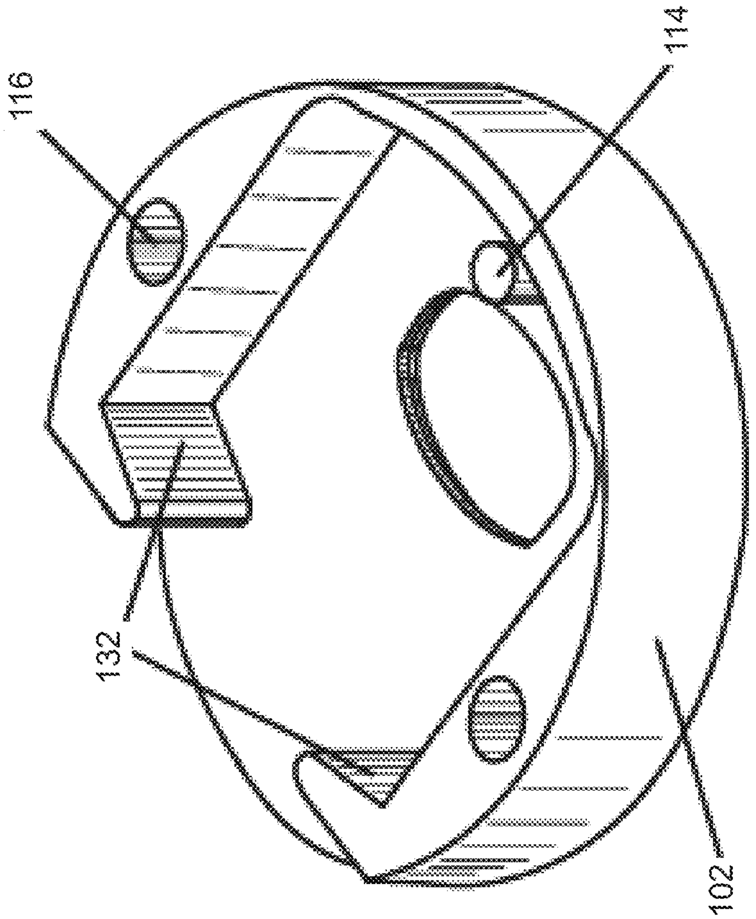
FIG. 4 depicts another more detailed schematic view of a cap component of a dispenser cap device, according to at least some embodiments disclosed herein.

FIG. 3 and FIG. 4 depict more detailed schematic views of the cap component 102 of the dispenser cap device. A dispensing hole 112 is at a second position, as shown in FIG. 7B. The protruding member 114 and the receiving member 116 attach the cap component 102 to the main body component 100 at the female connections or recessions 122 and the male connections or protrusions 126. The push piece component 106 is stopped at a second position as shown in FIG. 7B by a slanted wall component 118 of FIG. 3. To keep the push piece component 106 in its resting position of the first position of FIG. 7A, another slanted wall component 132 of FIG. 4 is stopped the springs 104 extending past its position.

Figure 5:
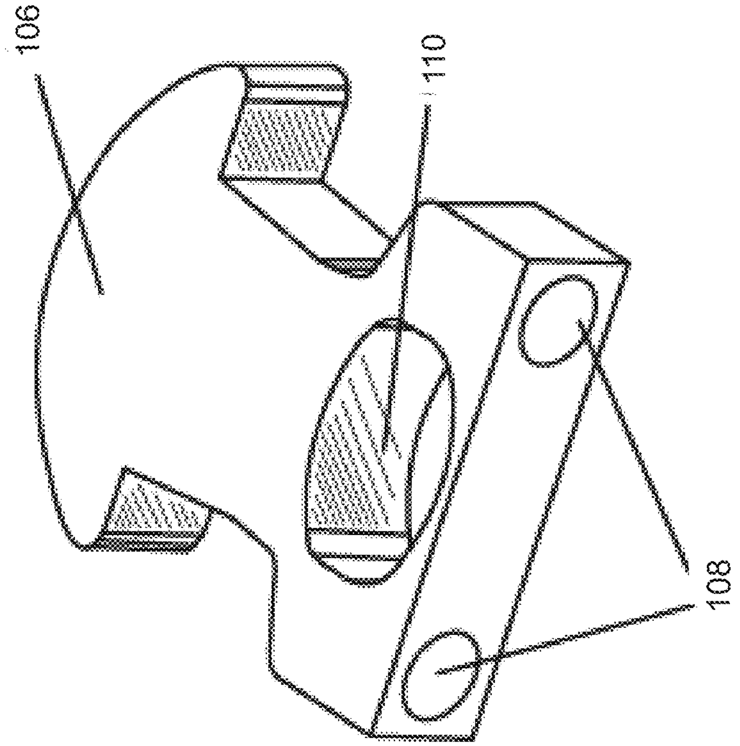
FIG. 5 depicts a more detailed schematic view of a push piece component of a dispenser cap device, according to at least some embodiments disclosed herein.
Figure 6:
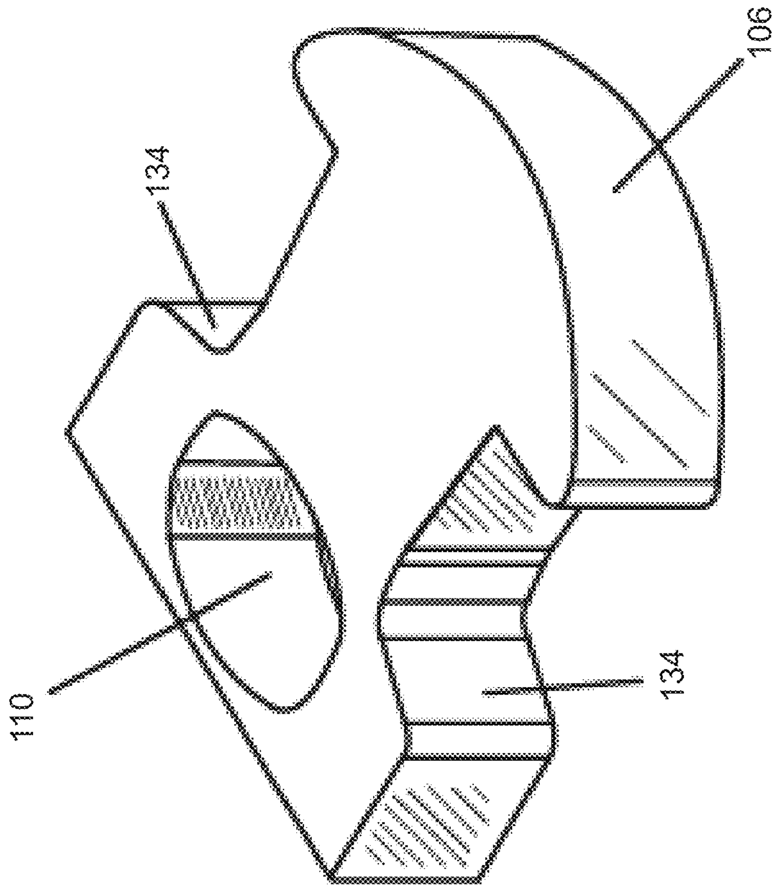
FIG. 6 depicts another more detailed schematic view of a push piece component of a dispenser cap device, according to at least some embodiments disclosed herein.

FIG. 5 and FIG. 6 depict more detailed schematic views of the push piece component 106 of the dispenser cap device. An opening at the receiving portions 108 are where the springs 104 are inserted. As described herein, the dispenser cap device utilizes a push system to dispense only those pills that fall into a chamber. A chamber component 110 holds the prescription pills as the piece moves from the first position of FIG. 7A to the second position of FIG. 7B, with the shape and size varying with the shape and size of the pills. The side of the push piece component 106 engages the slanted wall component 132 on the cap component 102 at a location 134.

As described, FIG. 7A depicts a schematic and cut-away view of the first position and FIG. 7B depicts a schematic and cut-away view of the second position. At the first position in FIG. 7A, the pills travel through the cavity inside of the main body component 100 and follow along a concave surface 130 to the cavity 128. The pills move from the main body component 100 to the chamber component 110 and then the push piece 106 is moved to a second position, such that the pills move from the chamber component 110 to a dispensing cavity 112. The push piece component 106 may be moved from the first position to the second position and the pills may then fall through the cap component 102 by means of the opening at the dispensing cavity 112. Moreover, a removable bottom component 150 allows for the refilling of the cavity of the main body component 100. In some embodiments, the removable bottom component 150 is optional. In other embodiments, the removable bottom component 150 is manufactured into the main body component 100.

Figure 8:
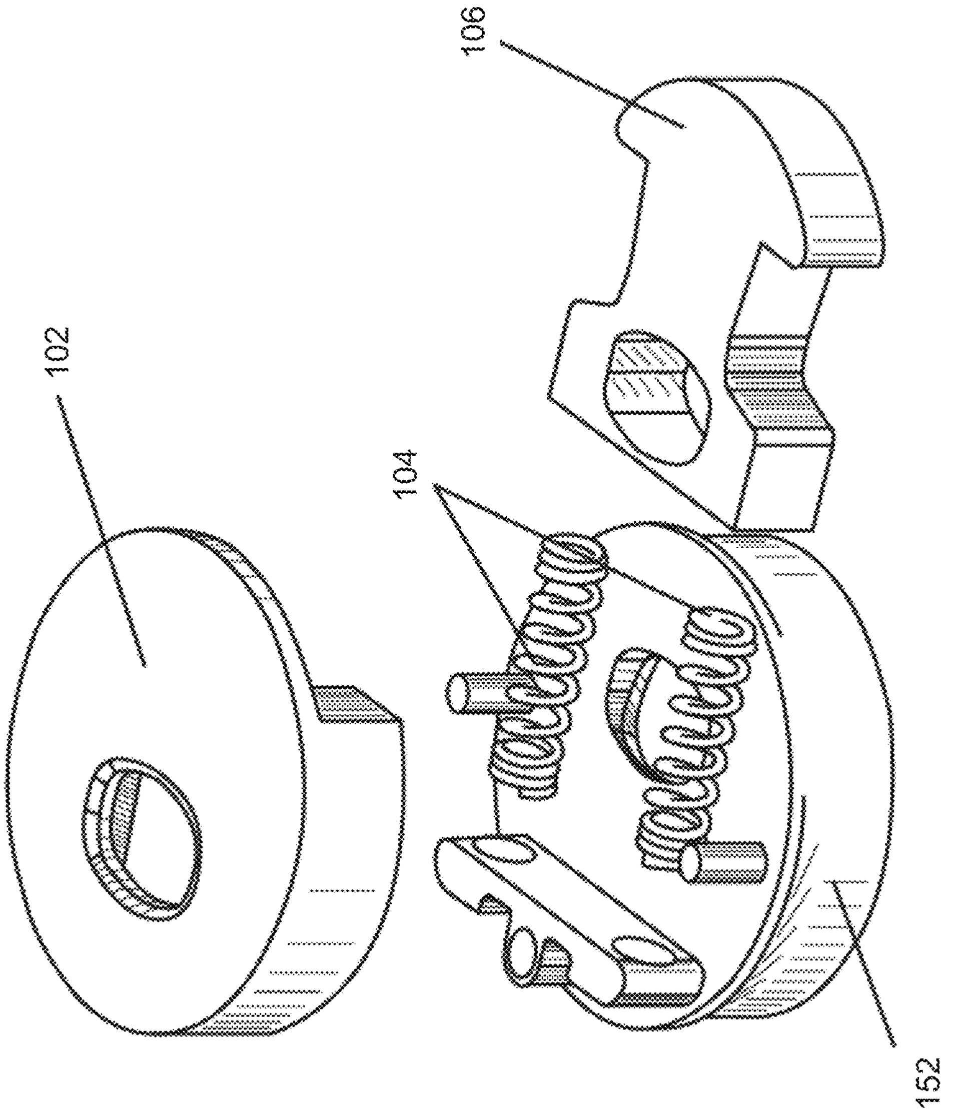
FIG. 8 depicts a schematic diagram of an exploded view of a prescription medication attachment to dispense prescription pills, according to at least some embodiments disclosed herein.

FIG. 8 depicts a schematic diagram of an exploded view of the prescription medication attachment to dispense the pills. The same mechanism described herein is used and includes the cap component 102, the springs 104, and the push piece component 106. The prescription bottle attachment version 152 of FIG. 8 is different in that it does not have its own cavity to store the prescription pills, but utilizes the prescription bottle itself to house the pills.

Figure 9:
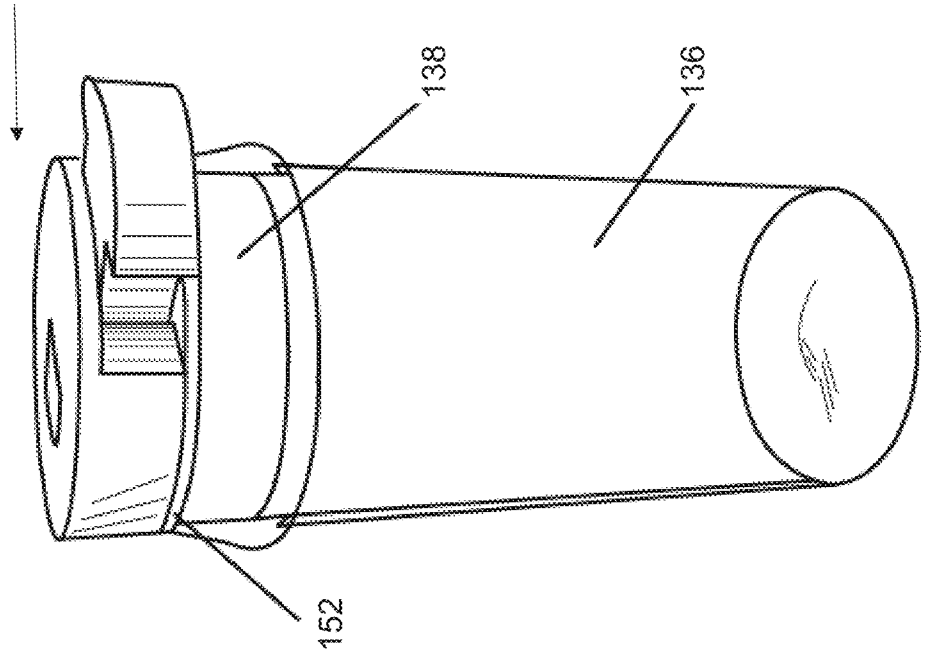
FIG. 9 depicts a schematic diagram of a prescription bottle attachment version comprising a tight fit snap component, according to at least some embodiments disclosed herein.
Figure 10:
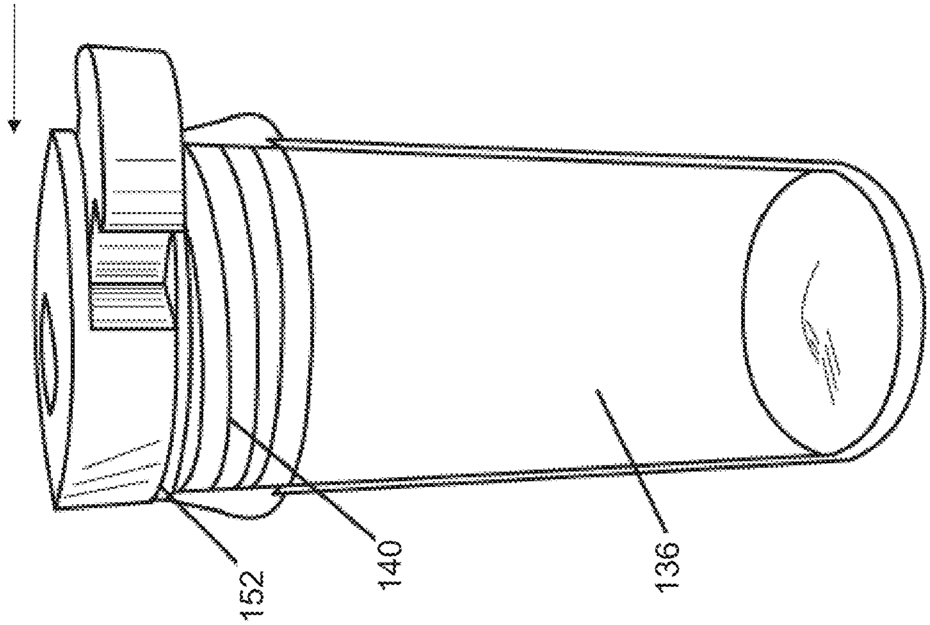
FIG. 10 depicts a schematic diagram of a prescription bottle attachment version comprising a threaded component, according to at least some embodiments disclosed herein.

FIG. 9 and FIG. 10 depict schematic diagrams of a prescription bottle attachment version 152. The lower half of the prescription bottle attachment version 152 be inserted into a prescription bottle 136 either by a tight fit snap component 138 of FIG. 9 or by a threaded component 140 of FIG. 10 that can be screwed in. Further, the arrows in FIG. 9 and FIG. 10 show the motion of the push piece component 106 in relation to the prescription bottle 136.

Figure 11:
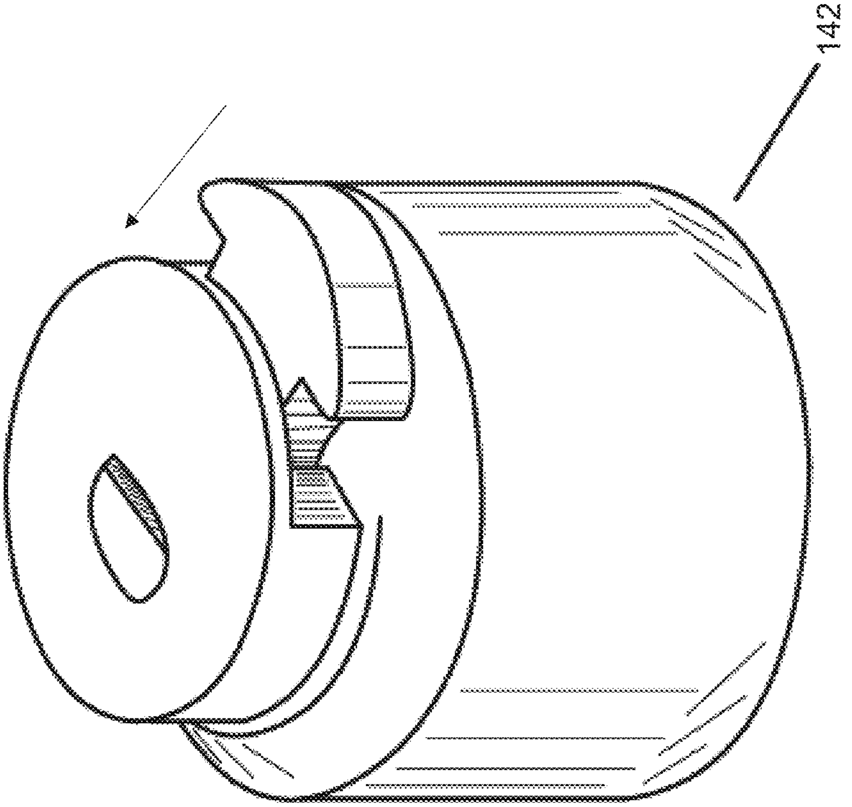
FIG. 11 depicts a schematic diagram of a stand-alone dispenser with a cavity, according to at least some embodiments disclosed herein.
Figure 12:
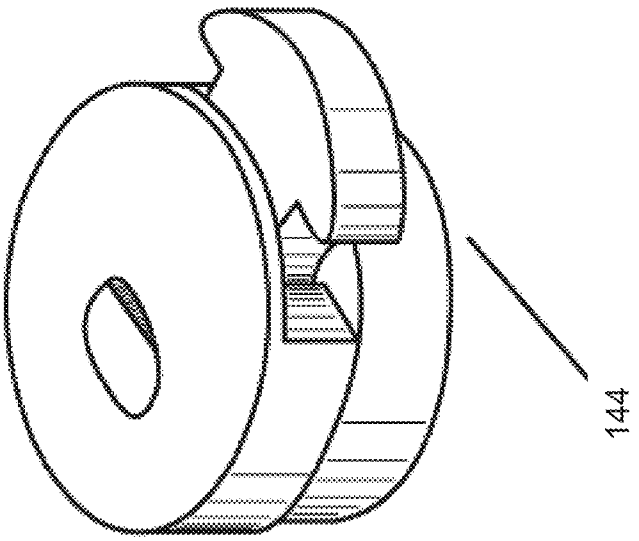
FIG. 12 depicts a schematic diagram of a prescription bottle attachment dispenser, according to at least some embodiments disclosed herein.

FIG. 11 depicts a schematic diagram of a stand-alone dispenser with a cavity 142, where the stand-alone dispenser with the cavity 142 of FIG. 11 is about 2 inches in height and about 2 inches in width, not including the furthest extension of the push piece component 106. FIG. 12 depicts a schematic diagram of a prescription bottle attachment dispenser 144, where the prescription bottle attachment dispenser 144 is about 0.75 inches in height and about 1.5 inches in width, not including the furthest extension of the push piece component 106. It should be appreciated that these dimensions are provided for illustrative purposes only and are in no way limiting or exhaustive. Further, an arrow in FIG. 11 shows the motion of the push piece component 106 in relation to the cavity 142.

Figure 13A:
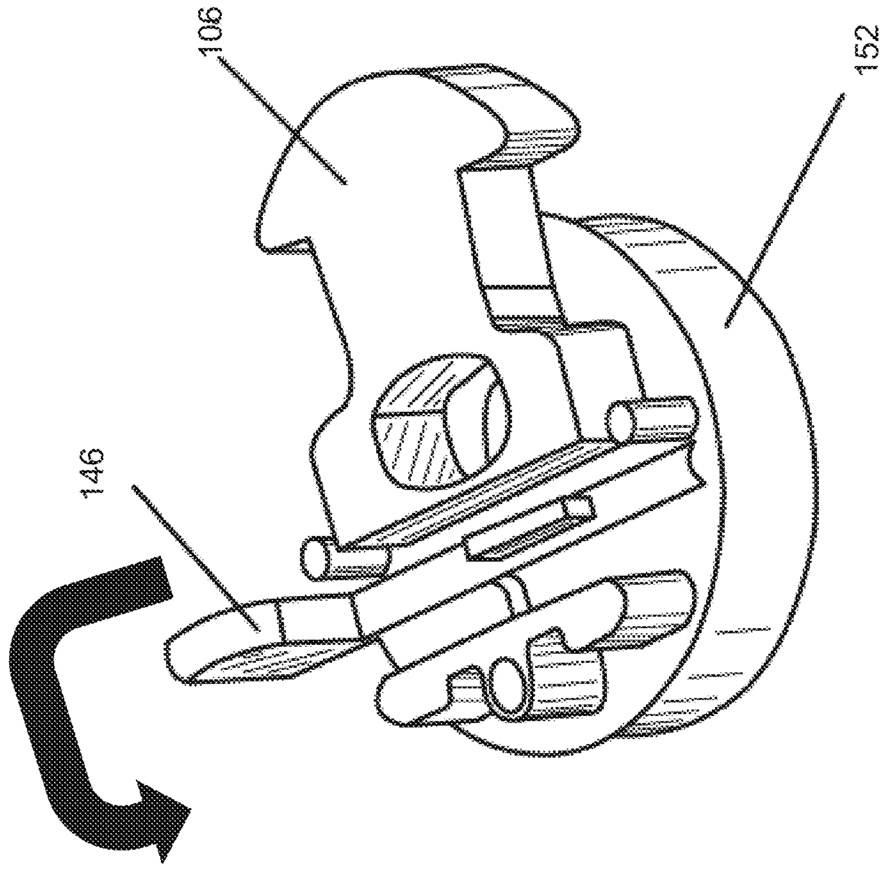
FIG. 13A depicts a schematic diagram of a safety pin option for a prescription bottle attachment dispenser, according to at least some embodiments disclosed herein.
Figure 13B:
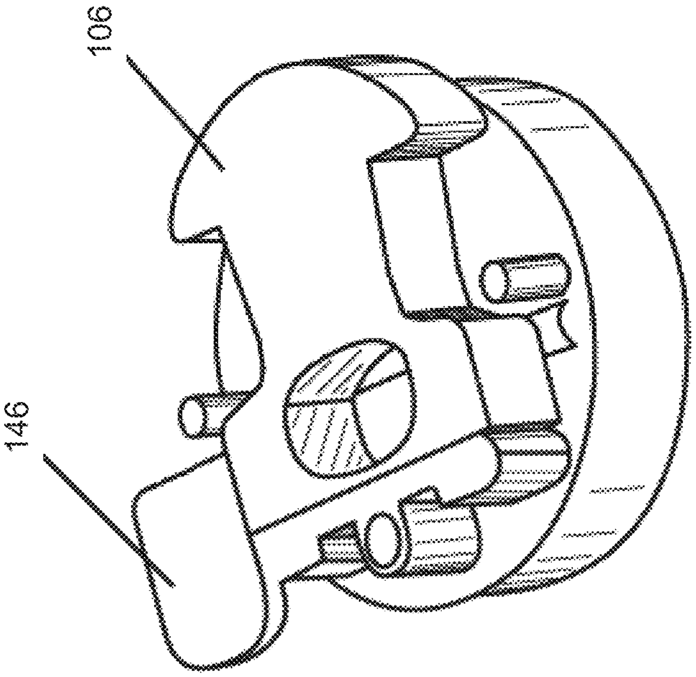
FIG. 13B depicts another schematic diagram of a safety pin option for a prescription bottle attachment dispenser, according to at least some embodiments disclosed herein.

FIG. 13A and FIG. 13B depict schematic diagrams of a safety pin option for a prescription bottle insert 152 described herein. Specifically, FIG. 13A depicts a pin component 146 and the push piece 106, which are depicted in the first position of FIG. 7A. If the pin 146 is rotated 90 degrees, as shown by the arrow in FIG. 13A, the push piece 106 is now able to move from the first position of FIG. 7A to the second position of FIG. 7B, as shown in FIG. 13B.

Figure 14:
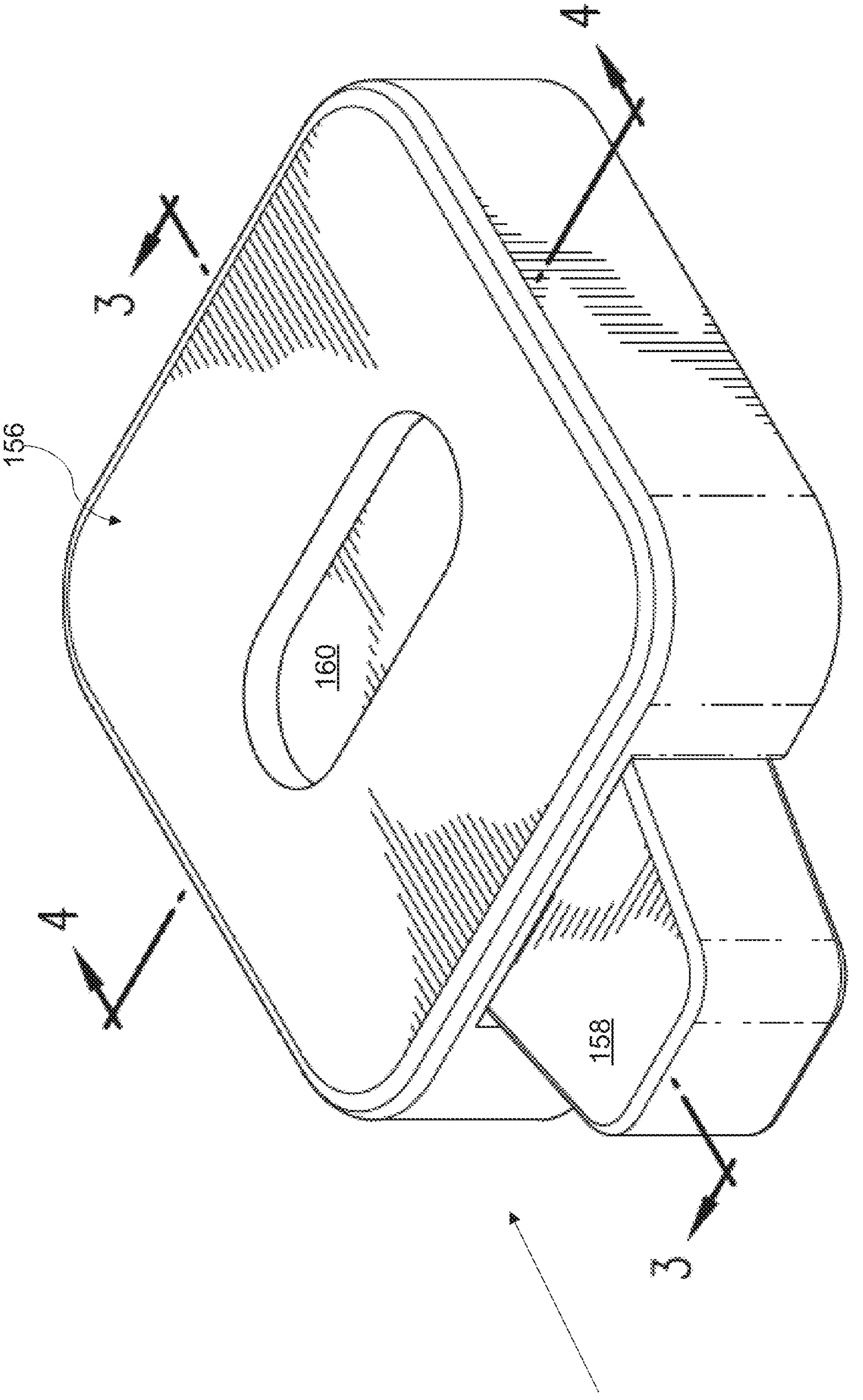
FIG. 14 depicts a schematic diagram and a top down view of another embodiment of a cap component of a dispenser cap device, according to at least some embodiments disclosed herein.

FIG. 14 depicts a schematic diagram and top down view of another embodiment of a cap component 156 that is substantially square in shape and comprises a top side disposed opposite a bottom side, a first side disposed opposite a second side, and a third side disposed opposite a fourth side. Though a square shape is depicted, other shapes and configurations are contemplated by Applicant. As shown in FIG. 14, the other embodiment of the cap component 156 additionally includes a first push component 158, which needs to be engaged by the user (as shown by the arrow) to move a closed position of an opening 160 to an open position. Moreover, the other embodiment of the cap component 156 is symmetrical about the 3' line since we only have one push component.

Figure 15:
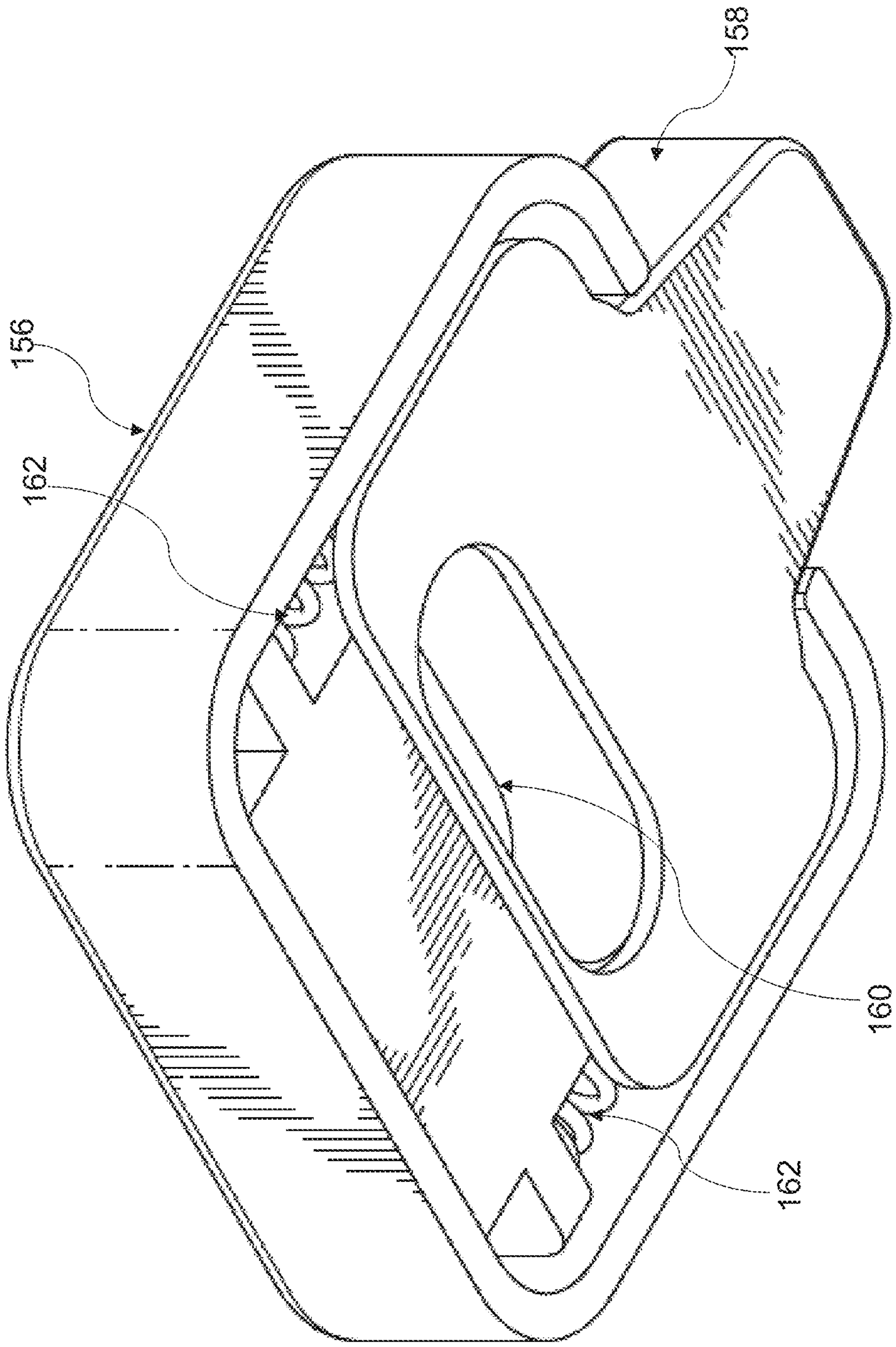
FIG. 15 depicts a schematic diagram and a bottom up view of the other embodiment of the cap component of FIG. 14, according to at least some embodiments disclosed herein.
Figure 16A:
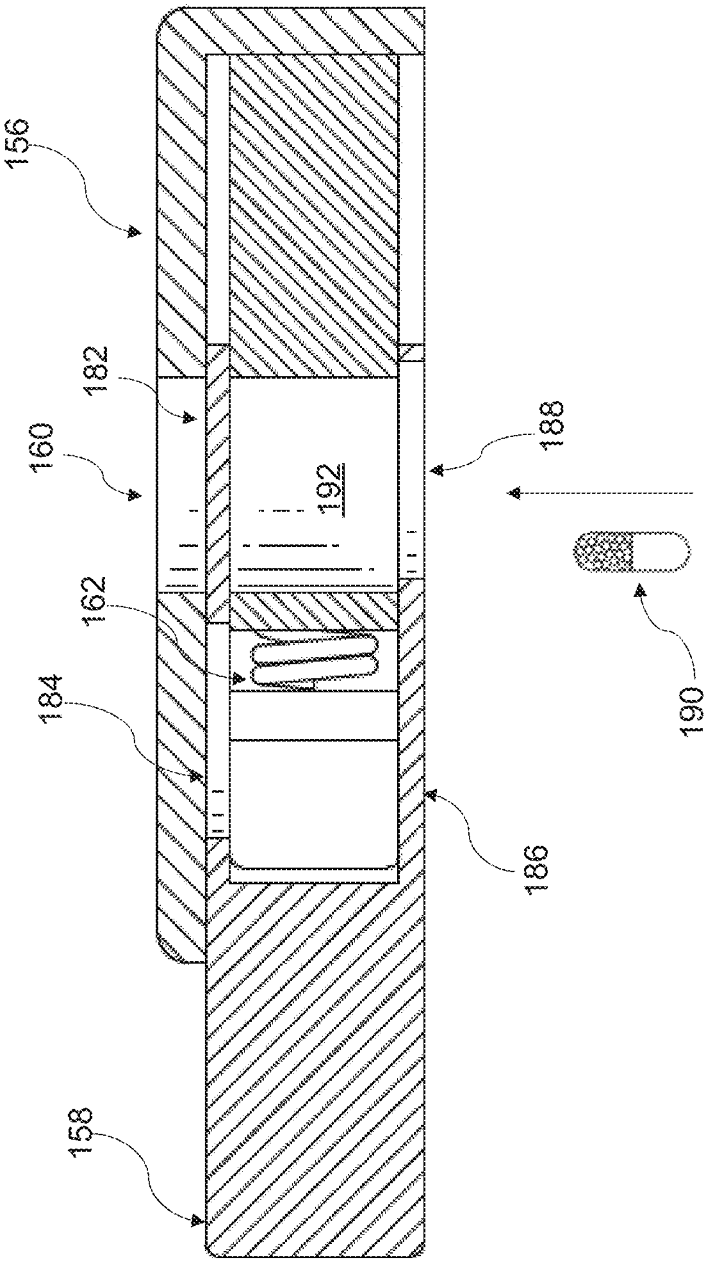
FIG. 16A, FIG. 16B, and FIG. 16C depict schematic diagrams and cut-away views of the embodiment of the cap component of FIG. 14 and FIG. 15, according to at least some embodiments disclosed herein.

FIG. 15 depicts a schematic diagram and a bottom up view of the embodiment of a cap component 156 of FIG. 14. FIG. 15 additionally depicts the springs 162. FIG. 16A, FIG.

Figure 16B:
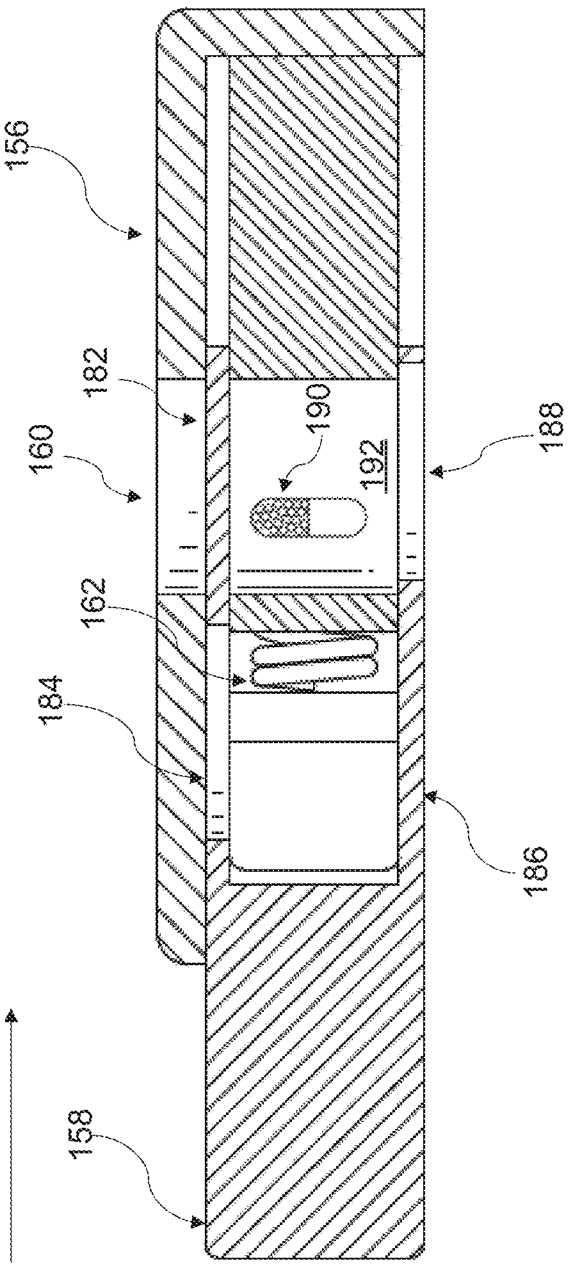
Figure 16C:
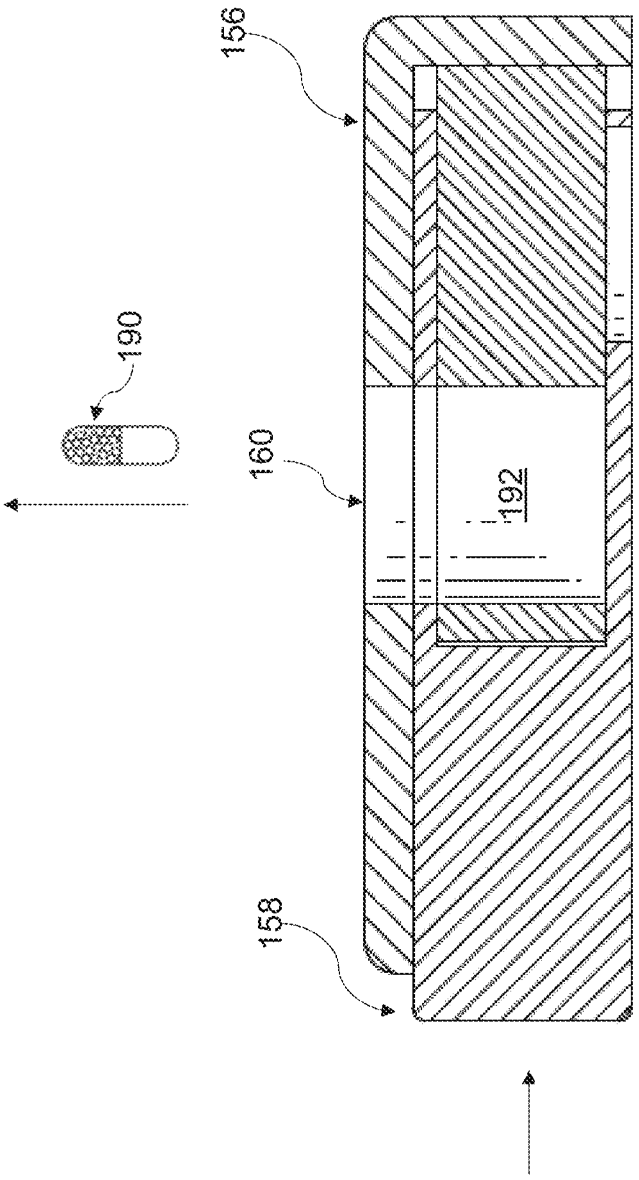

16B, and FIG. 16C depict schematic diagrams and cut-away views of the other embodiment of a cap component 156 of FIG. 14 and FIG. 15. The embodiment of FIG. 16A, FIG. 16B, and FIG. 16C includes a first opening 188, a second opening 184, a first door 182, and a second door 186. During use, and as depicted in FIG. 16A and FIG. 16B, a prescription pill 190 is received by the first opening 188 and into a location 192. The prescription pill 190 is stopped by the first door 182. Once the first push component 158 is engaged as shown in FIG. 16C, the second opening 184 moves towards the first door 182 and the second door 186 moves to the first opening 188 such that the prescription pill 190 falls out of the opening 160.

Figure 17:
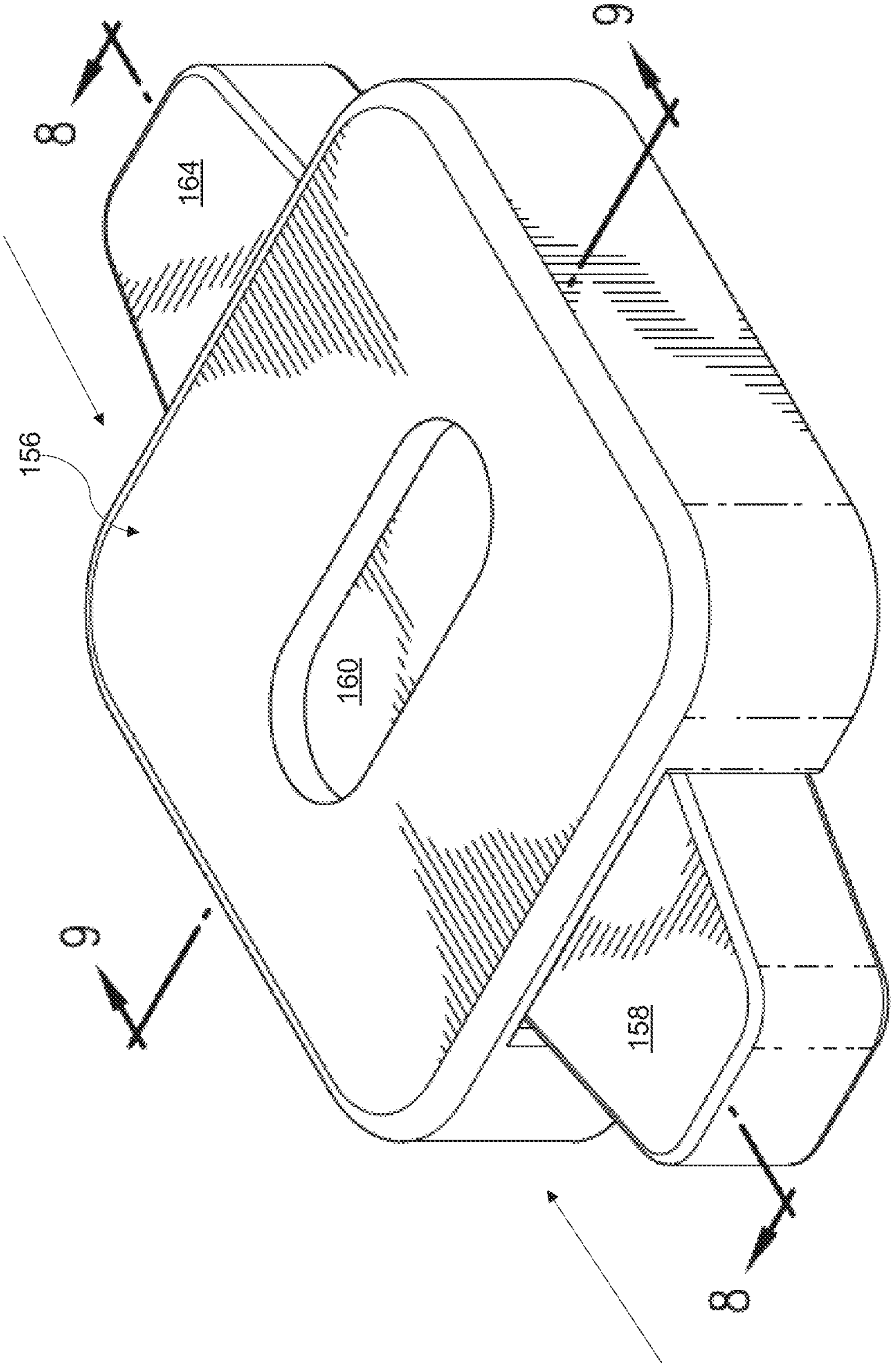
FIG. 17 depicts a schematic diagram and a top down view of an embodiment of a cap component of a dispenser cap device, according to at least some embodiments disclosed herein.

FIG. 17 depicts a schematic diagram and top down view of the embodiment of the cap component 156. However, differing from FIG. 14, FIG. 15, FIG. 16A, FIG. 16B, and FIG. 16C, FIG. 17 depicts two push components (e.g., a first push component 158 and a second push component 164), which need to both be engaged by the user (as shown by the arrows) to move the closed position of the opening 160 to the open position. Moreover, the embodiment of the cap component 156 of FIG. 17 and FIG. 18 is symmetrical about the 8' line and the 9' line since this embodiment includes both the first push component 158 and the second push component 164.

Figure 18:
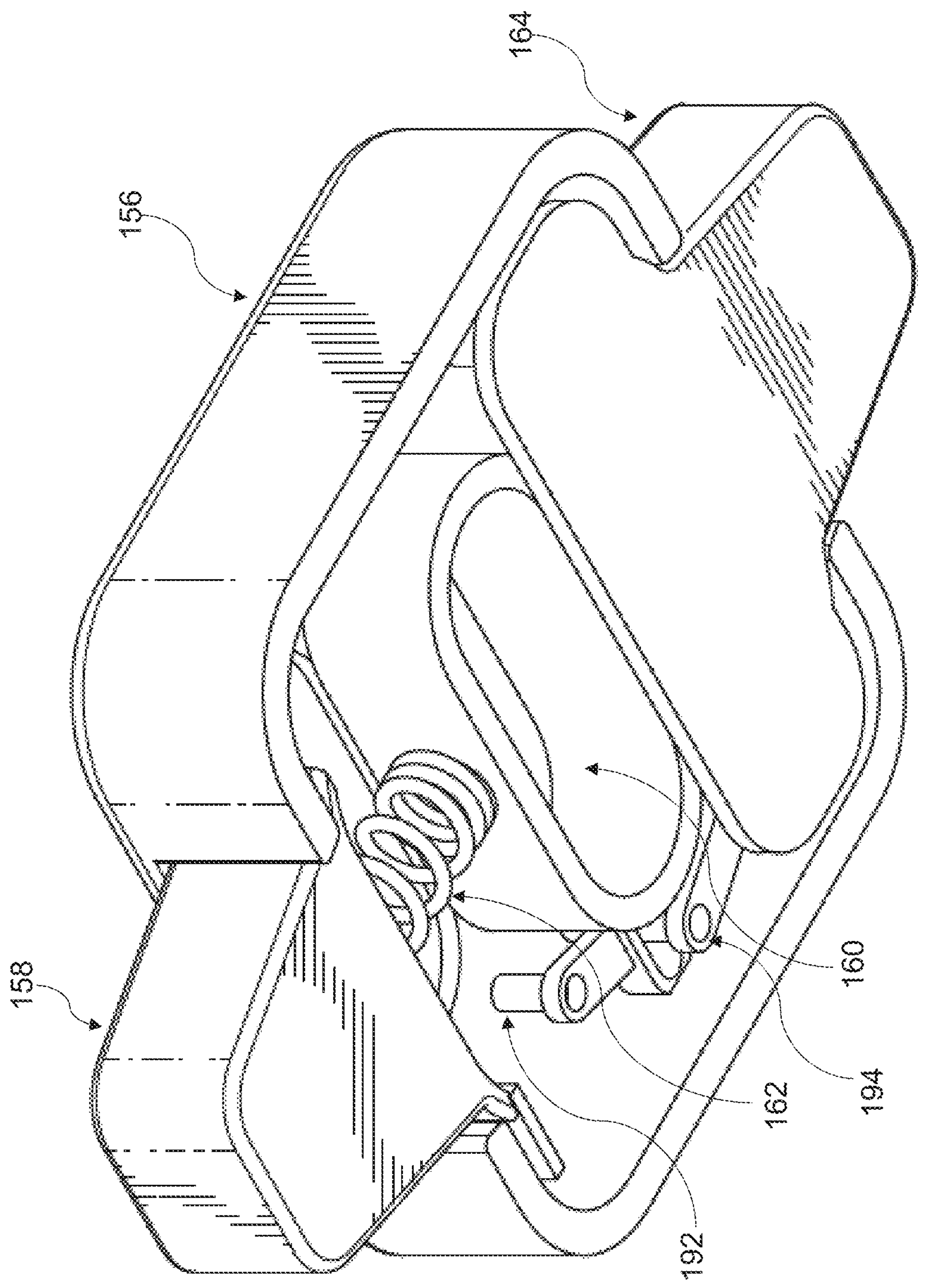
FIG. 18 depicts a schematic diagram and a bottom up view of the embodiment of the cap component of FIG. 17, according to at least some embodiments disclosed herein.

Moreover, FIG. 18 additionally includes linkages, shown as a first linkage 192 and a second linkage 194. The linkages connect to a single cylinder, which is on a path. To engage the system, the user must push both the first push component 158 and the second push component 164 at the same time such that both of the first linkage 192 and the second linkage 194 move in unison to push the cylinder on the path. If only one of the first push component 158 or the second push component 164 is pushed or engaged by the user, the system will not intentionally function. It should be appreciated that other systems may be utilized that function similar to the linkages described herein, such as a dual rack mechanism with a single pinon.

Figure 19A:
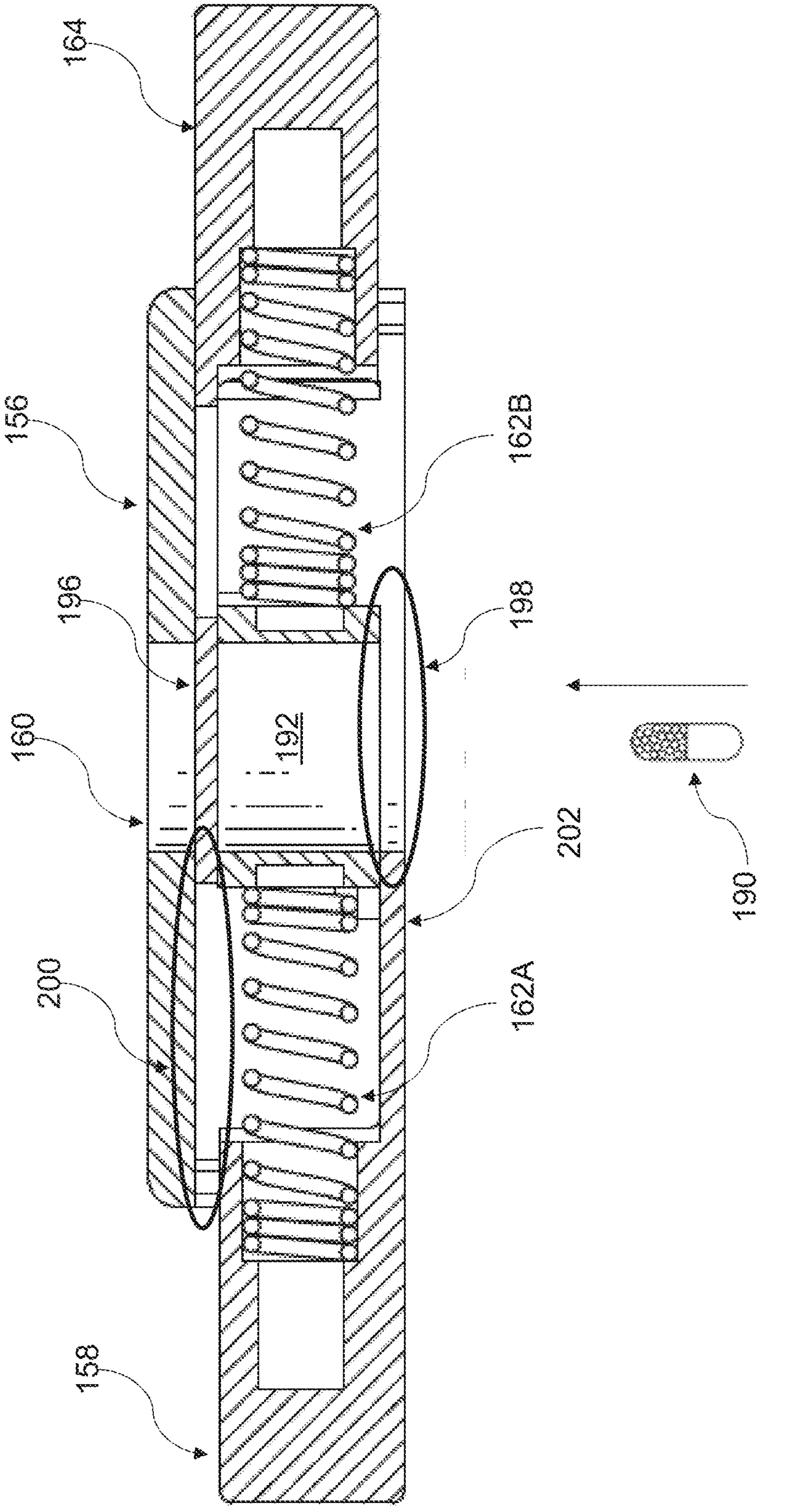
FIG. 19A, FIG. 19B, and FIG. 19C depict schematic diagrams and cut-away views of the embodiment of the cap component of FIG. 17 and FIG. 18, according to at least some embodiments disclosed herein.
Figure 19B:
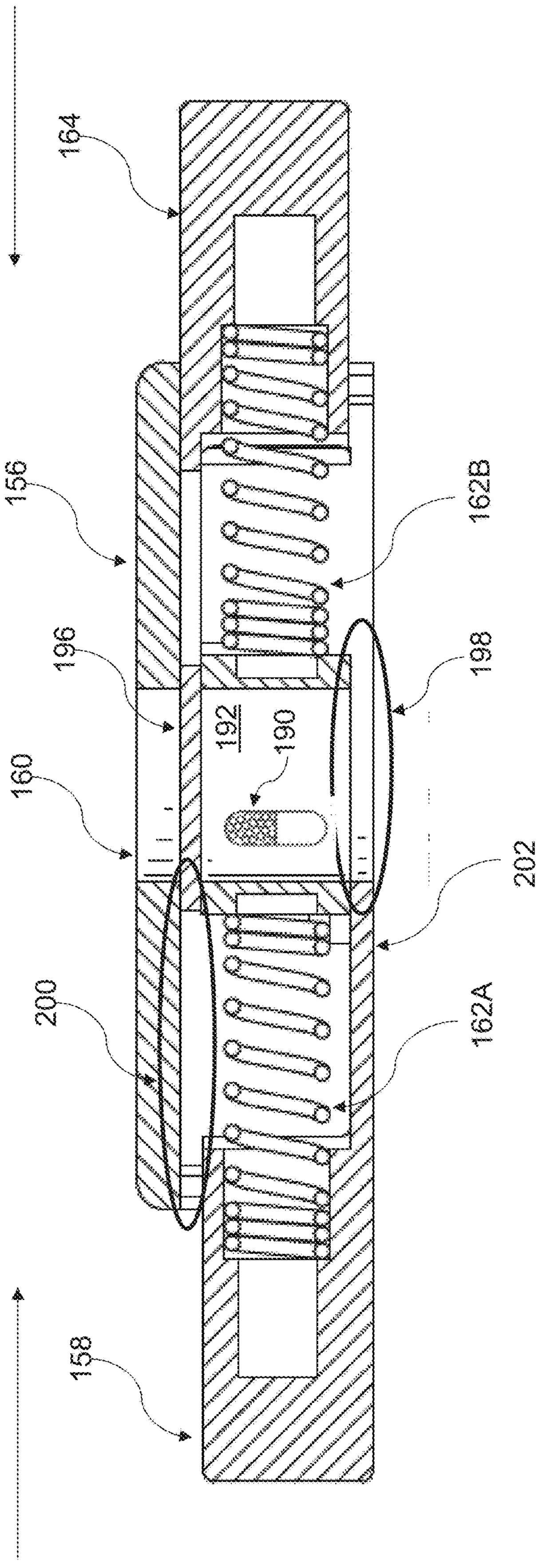
Figure 19C:
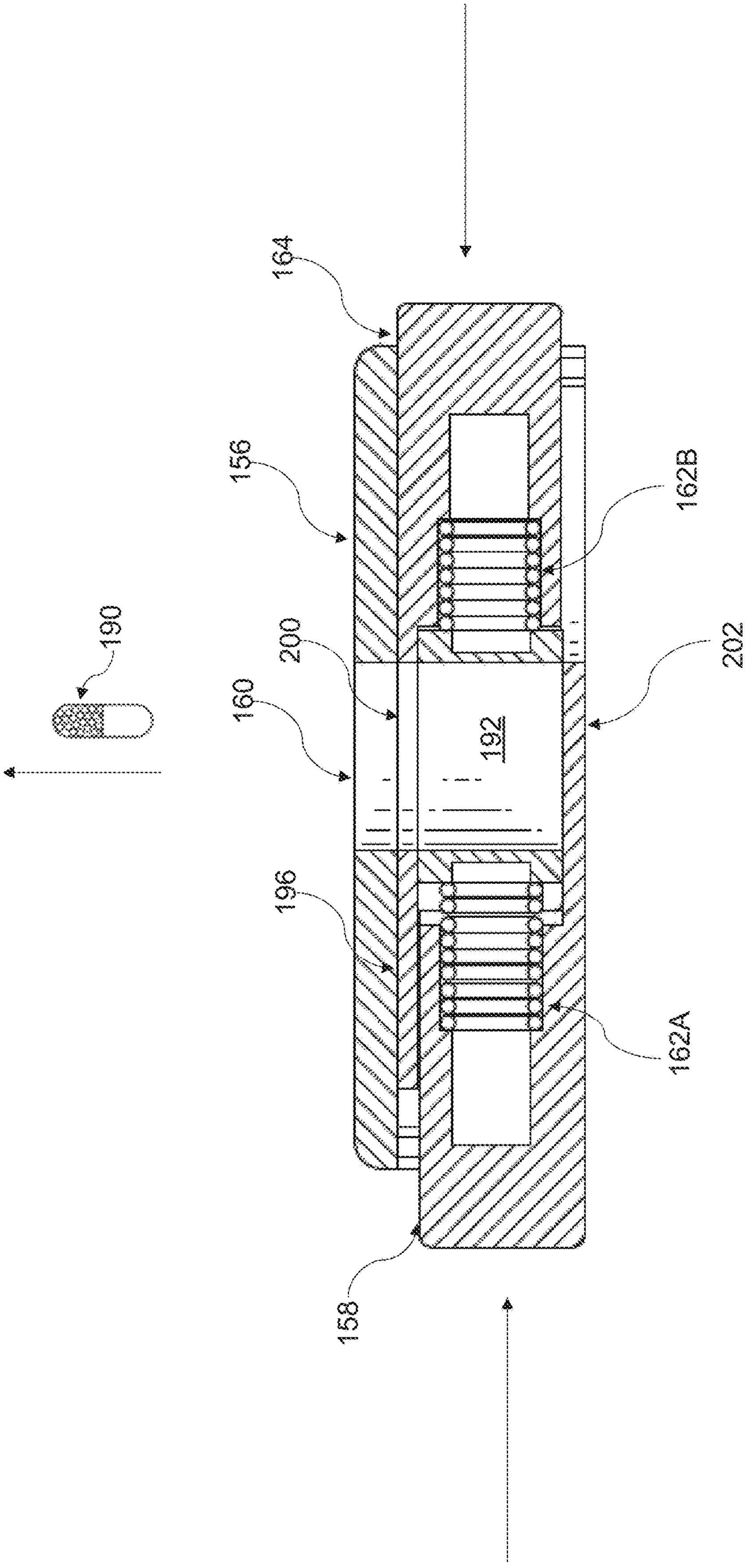

FIG. 19A, FIG. 19B, and FIG. 19C depict schematic diagrams and cut-away views of the embodiment of the cap component 156 of FIG. 17 and FIG. 18. Specifically, a first spring component 162A, a second spring component 162B, a first door component 202, a second door component 196, a first opening 198, and a second opening 200 are depicted in FIG. 19A. The first spring component 162A and the second spring component 162B work in unison with one another.

For example, as shown in FIG. 19A, the prescription pill 190 is received by the first opening 198 and into the location 192. To engage this system, and as shown in FIG. 19B, the user pushes the first push component 158 horizontally towards the opening 160, which compresses the first spring component 162A and moves the first door component 202 to cover the first opening 198. Moreover, when the user pushes the second push component 164 horizontally towards the opening 160, this action compresses the second spring component 162B and moves the second door component 196 to cover the second opening 200. The compression of the first push component 158 and the second push component 164 is depicted in FIG. 19C. The user must engage both the first push component 158 and the second push component 164 in unison to "close" the first opening 198 with the first door component 202 and "open" the second location 200 with the second door component 196 such that the prescription pill 190 is removed via the opening. This embodiment may be utilized for child safety purposes since two components must be engaged in unison for the system to function.

Figure 20:
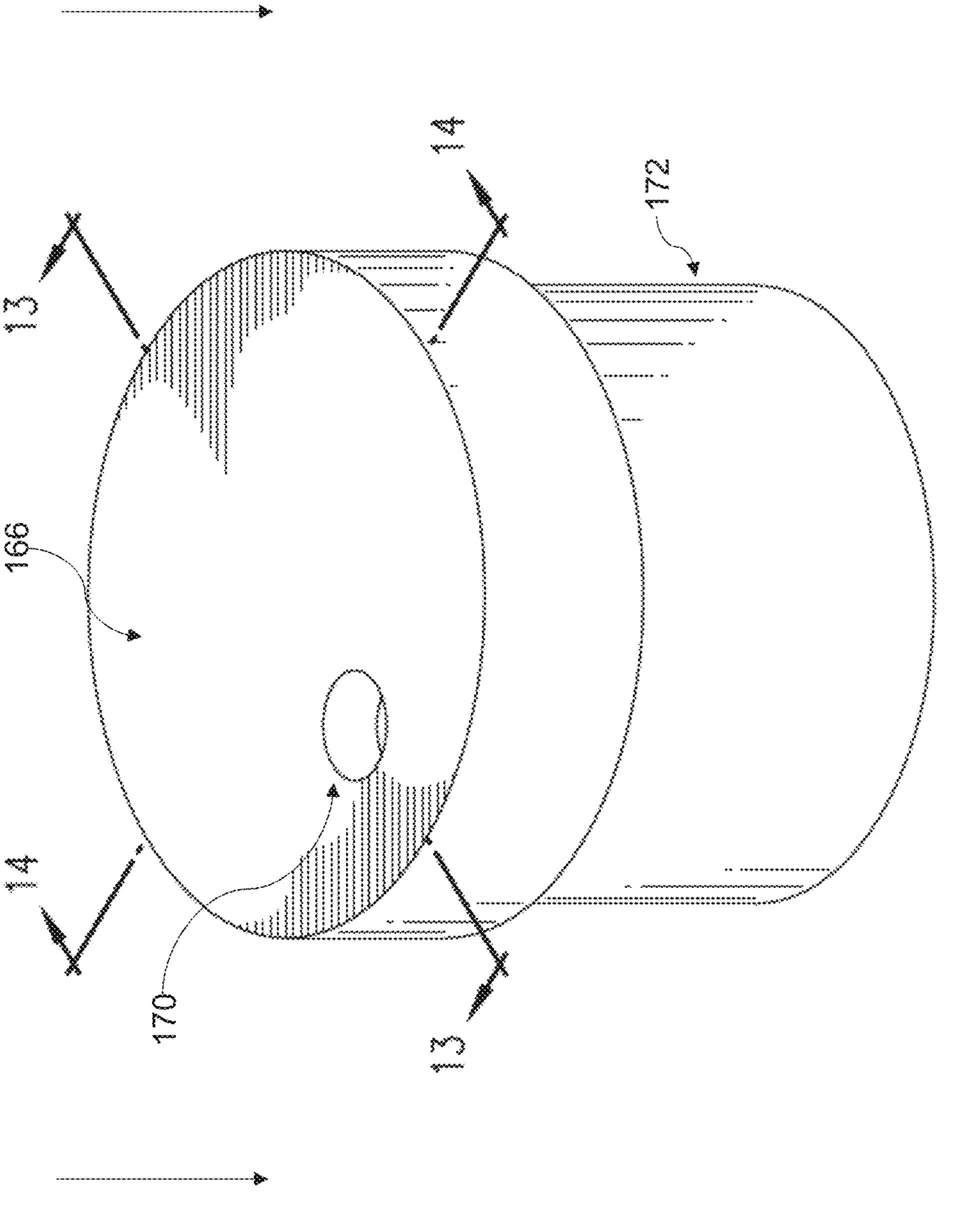
FIG. 20 depicts a schematic diagram and a perspective view of another embodiment of a dispenser cap device, according to at least some embodiments disclosed herein.
Figure 21:
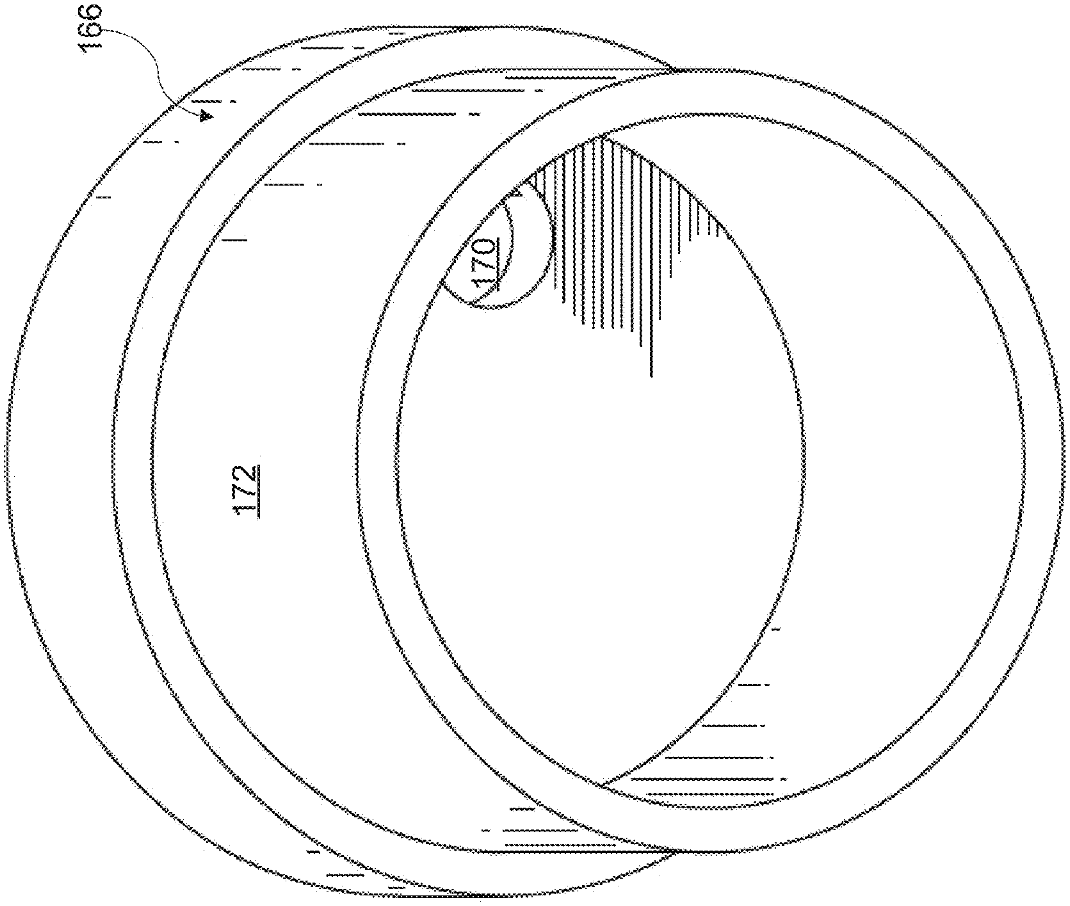
FIG. 21 depicts a schematic diagram and a bottom up view of the other embodiment of the dispenser cap device of FIG. 20, according to at least some embodiments disclosed herein.

FIG. 20 depicts a schematic diagram of another embodiment of the dispenser cap device and FIG. 21 depicts a schematic diagram and a bottom up view of the other embodiment of the dispenser cap device of FIG. 20. Specifically, FIG. 20 depicts a dispenser cap component 166 that includes an opening 170. The dispenser cap component 166 is affixed to a prescription bottle or container 172. The dispenser cap component 166 also includes an internal ramp (not shown) and an internal spring (not shown). During use, the prescription pill falls into a cavity of the prescription bottle or container 172. When the user pushes down on the dispenser cap component 166 (e.g., shown by the arrows in FIG. 20), the internal spring is compressed and rotation occurs such that the prescription pill slides along the internal ramp in a downwards motion. Due to gravity, the prescription pill falls through the opening 170. Rotation of the internal ramp component closes/blocks off a portion of the opening 170 to ensure that the prescription pill does not fall back into the cavity of the prescription bottle or container 172.

In each of the embodiments described herein, gravity assists in the retrieval of the prescription pill(s) from the prescription bottle or container. In another example of a dispensing mechanism, a lever component may be affixed to the cap component 102 such that movement of the lever component in a left or right direction relative to the cap component 102 unseals an opening and allows for retrieval of the prescription pill(s) from the prescription bottle or container to which the cap component 102 is affixed. In another example, the user may push down on a component relative to a base of the prescription bottle or container such that gravity pushes the prescription pill(s) upwards and through an opening in the cap component 102. In a further example, when the user pushes downward on the cap component 102 in relation to the prescription bottle/container, the prescription pill falls into the prescription bottle or container. Further, an upward motion on the cap component 102 in relation to the prescription bottle/container allows for the prescription pill(s) to be dispensed through an opening.

In a further example, an interior of the prescription bottle or container may comprise a storage area where the prescription pills are stored/housed and a channel such that a movement on the cap component 102 (e.g., when user pushes upward on the cap component 102 in relation to the prescription bottle/container), forces the prescription pill into the channel and allows the prescription pill to exit the prescription bottle or container via an opening. It should be appreciated that this opening may be proximate the cap component 102, but the location of the opening is not limited to such location.

In other embodiments, the system described herein may utilize a rotational push mechanism, where the prescription pill drops lineally. In this example, the pill is in a chamber that, instead of the whole cap being pushed, a button attached to a chamber rotates and every other component remails stationary. This provides a linear compression and rotational movement.

It should be appreciated that other mechanisms may be used with the instant invention. For example, a first mechanism may include a user rotational action, where a spring-loaded lever rotates about a pivot on a center of a cap/lid of the prescription bottle or container. The spring-loaded lever is parallel to the cap/lid. At a first position of the spring-loaded lever, a pill falls into an opening/hole in the cap/lid of the prescription bottle or container and cannot move any further. Next, the user rotates the spring-loaded lever to a second position, which is at a 45 degree angle from the first position. This action allows the pill to fall through an opening. When the user releases the spring-loaded lever, the spring-loaded lever moves back to the first position.

A second mechanism is similar in concept to the first mechanism. However, in this mechanism, the lever component is not directly rotated by the user. The user performs a linear action that is converted into a rotational movement via a ramp component. First, the pill, via gravity, is fed into the lever component. Then, the cap/lid of the prescription bottle or container is pushed up or the body of the prescription bottle or container is pushed down (or pushed together) by the user. This action rotates the lever component with respect to the cap/lid on a Z-axis and through a ramp, the pill moves linearly from a first position to a second position and falls out of the prescription bottle or container by gravity.

A third mechanism is similar to the second mechanism described herein. However, in this mechanism, the cap/lid and the body of the prescription bottle or container do not move. Only the lever component moves inside of the cap/lid. In this mechanism, the lever component comprises a button. In this example, the button is internal to the prescription bottle or container on a bottom plate. The pill moves into the lever component in a first position. A linear compression action of the button of the lever component cause a rotational action in the negative Z direction to allow the pill to fall out of an opening at a second position.

A fourth mechanism includes a linear action. However, this mechanism differs from the first, second, and third mechanisms described previously, as in those mechanisms, the pill was preloaded. This mechanism includes a zero/rest position, a first/loaded position, and a second/release position. At the zero/rest position, the cap component is empty. The user must load the pill into the cap component by pushing the cap component together towards the main body of the prescription bottle or container, which results in the pill moving into a first/loaded position. Upon release by the user, the pill moves down and feeds out of an opening (e.g., the second/release position).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A dispenser cap device that aids in dispensing pills from a container, the dispenser cap device comprising:

a main body component comprising a first opening at a first position, the main body component being insertable into a container;

a push piece component comprising a chamber that is pushed along springs, the push piece component being insertable into the main body component; and a cap component comprising a second opening at a second position, wherein the cap component is configured to seal the push piece component between itself and the main body component;

wherein when a user turns the container upside down, gravity feeds the pills through the first opening of the main body component into the chamber of the push piece component at the first position, and wherein compression of the springs allows the push piece component to move the pills from the first position to the second position such that the pills fall out of the chamber through the second opening at the second position.

2. The dispenser cap device of claim 1, wherein the main body component, the push piece component, the cap component, and the springs, through a single action, dispense the pills from the container.

3. The dispenser cap device of claim 1, wherein the main body component further comprises a locking mechanism to prohibit dispensing of the pills if a lock is in a locked position.

4. The dispenser cap device of claim 1, wherein the cap component is attached to the main body component by corresponding male protrusions and female recessions.

5. The dispenser cap device of claim 1, further comprising:

a removable bottom component disposed inside of the main body component.

6. The dispenser cap device of claim 1, wherein the main body component comprises a bottom component manufactured inside of the main body component.

7. The dispenser cap device of claim 1, wherein the pills are stored in the container.

8. The dispenser cap device of claim 1, wherein a cavity inside of the main body component stores the pills.

9. A dispenser cap device that aids in dispensing pills from a prescription bottle, the dispenser cap device comprising:

a main body component comprising a first opening at a first position;

a push piece component comprising a chamber that is pushed along springs, wherein the push piece component is insertable into the main body component; and a cap component comprising a second opening in a second position, wherein the cap component is configured to seal the push piece component between itself and the main body component;

wherein when a user turns the prescription bottle upside down, gravity feeds the pills through the first opening of the main body component into the chamber of the push piece at the first position, and wherein compression of the springs allows the push piece component to move the pills from the first position to the second position such that the pills fall out of the chamber through the second opening to dispense the pills.

10. The dispenser cap device of claim 9, wherein a portion of the dispenser cap device is inserted into the prescription bottle by a tight fit snap component.

11. The dispenser cap device of claim 9, wherein a portion of the dispenser cap device is inserted into the prescription bottle by a threaded component.

12. The dispenser cap device of claim 9, wherein the dispenser cap device is about 0.75 inches in height and about 1.5 inches in width excluding the push piece component at a maximum extension.

13. A dispenser cap device that aids in dispensing pills from a container, the dispenser cap device comprising:

a main body component comprising a first opening at a first position;

a pin component;

a push piece component comprising a chamber that is pushed along springs, wherein the push piece component is insertable into the main body component; and a cap component comprising a second opening in a second position, wherein the cap component is configured to seal the push piece component between itself and the main body component;

wherein when a user rotates the pin component 90 degrees, the push piece component moves from the first position to the second position such that the pills fall out of the chamber through the second opening to dispense the pills.

14. A dispenser cap device that aids in dispensing pills, the dispenser cap device comprising:

a first portion affixed to a second portion;

the first portion comprising:

a substantially circular planar portion having a first side disposed opposite a second side;

an opening disposed therein; and a wall disposed circumferentially around and extending away from the second side of the substantially circular planar portion; and the second portion comprising:

a hollow component having an interior side disposed opposite an exterior side; and a planar portion located proximate and extending away from the second side of the substantially circular planar portion of the first portion, wherein a diameter of the substantially circular planar portion of the first portion is larger than a diameter of the planar portion of the second portion such that the wall comes into a slidable contact with the exterior side of the second portion;

wherein, when a user pushes the first portion towards the second portion, the second side of the substantially circular planar portion of the first portion comes into contact with the planar closed portion, allowing for the dispensing of pills from an interior of the cylindrical portion.

* * * * *